United States Patent
Suzuki et al.

(10) Patent No.: US 9,348,740 B2
(45) Date of Patent: May 24, 2016

(54) MEMORY ACCESS CONTROLLER, MULTI-CORE PROCESSOR SYSTEM, MEMORY ACCESS CONTROL METHOD, AND COMPUTER PRODUCT

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP); Kensuke Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 13/707,306

(22) Filed: Dec. 6, 2012

(65) Prior Publication Data
US 2013/0097389 A1    Apr. 18, 2013

Related U.S. Application Data

(63) Continuation of application No. PCT/JP2010/059700, filed on Jun. 8, 2010.

(51) Int. Cl.
*G06F 13/00* (2006.01)
*G06F 15/16* (2006.01)
(Continued)

(52) U.S. Cl.
CPC ............... *G06F 12/00* (2013.01); *G06F 9/526* (2013.01); *G06F 2209/522* (2013.01)

(58) Field of Classification Search
CPC ....... G06F 9/3834; G06F 9/526; G06F 9/544; G06F 12/084; G06F 1/3287; G06F 17/30902; G06F 1/3206; G06F 1/3225; G06F 9/524; G06F 12/0808; G06F 1/3203; G06F 1/3296; G06F 12/0806; G06F 11/0724; G06F 11/2242; G06F 2212/1028
See application file for complete search history.

(56) References Cited

U.S. PATENT DOCUMENTS

| 7,249,270 | B2 | 7/2007 | Mansell et al. | |
| 8,738,860 | B1 * | 5/2014 | Griffin et al. | 711/122 |

(Continued)

FOREIGN PATENT DOCUMENTS

| GB | 2 414 573 A | 11/2005 |
| GB | 2 444 148 A | 5/2008 |

(Continued)

OTHER PUBLICATIONS

[ARM11 MPCore Processor Revision: r2p0 Technical Reference Manual] searched on Apr. 12, 2010; http://infocenter.arm.com/help/topic/com.arm.doc.ddi0360F/DDI0360F_arm11_mpcore_r2p0_trm.pdf p. 11-8.

(Continued)

*Primary Examiner* — Kevin Verbrugge
*Assistant Examiner* — Candice Rankin
(74) *Attorney, Agent, or Firm* — Arent Fox LLP

(57) ABSTRACT

A memory access controller includes a semiconductor circuit configured to classify into a first group of cores having made an exclusive access request to shared memory and a second group of cores not having made an exclusive access request to the shared memory, multiple cores capable of accessing the shared memory; detect a core having completed the exclusive access among the first group of cores; and send to a core among the first group of cores and standing by for the exclusive access, a notification of release from a standby state, when detecting a core having completed the exclusive access.

5 Claims, 15 Drawing Sheets

(51) Int. Cl.
*G06F 12/00* (2006.01)
*G06F 9/52* (2006.01)

(56) References Cited

U.S. PATENT DOCUMENTS

| | | | |
|---|---|---|---|
| 2005/0268001 A1 | 12/2005 | Kimelman et al. | |
| 2005/0268106 A1* | 12/2005 | Mansell et al. | 713/182 |
| 2007/0150658 A1* | 6/2007 | Moses et al. | 711/130 |
| 2009/0006784 A1 | 1/2009 | Takeuchi | |
| 2010/0131720 A1 | 5/2010 | Harper, III et al. | |
| 2010/0325371 A1* | 12/2010 | Jagadish et al. | 711/150 |
| 2011/0167222 A1* | 7/2011 | Lee et al. | 711/118 |

FOREIGN PATENT DOCUMENTS

| | | |
|---|---|---|
| JP | 56-145442 A | 11/1981 |
| JP | 01-305457 A | 12/1989 |
| JP | 08-320828 A | 12/1996 |
| JP | 2005-339500 A | 12/2005 |
| WO | WO 2007/099616 A1 | 9/2007 |

OTHER PUBLICATIONS

[pthread_spin_lock] searched on Apr. 9, 2010; URL:http://www.opengroup.org/onlinepubs/009695399/functions/pthread_spin_lock.htm.
[RealView Compilation Tools Version 3.1 Assembler Guide] searched on Apr. 9, 2010; URL:http://infocenter.arm.com/help/topic/com.arm.doc.dui0204H_rvct_assembler_guide.pdf p. 4-139,p. 4-140.
[Spinlock—Wikipedia, the free encyclopedia] searched on Apr. 9, 2010; URL:http://en.wikipedia.org/wiki/Spinlock.
[User-Level Spin Locks—CodeProject] searched on Apr. 9, 2010; www.codeproject.com/kb/threads/spinlocks.aspx.
Extended European Search Report, Application No. 10852867.0 dated Jul. 4, 2013.
Lee, et al., "Synchronization with Multiprocessor Caches,"Proceedings of the Annual International Symposium on Computer Architecture, pp. 27-37, May 28, 1990.

* cited by examiner

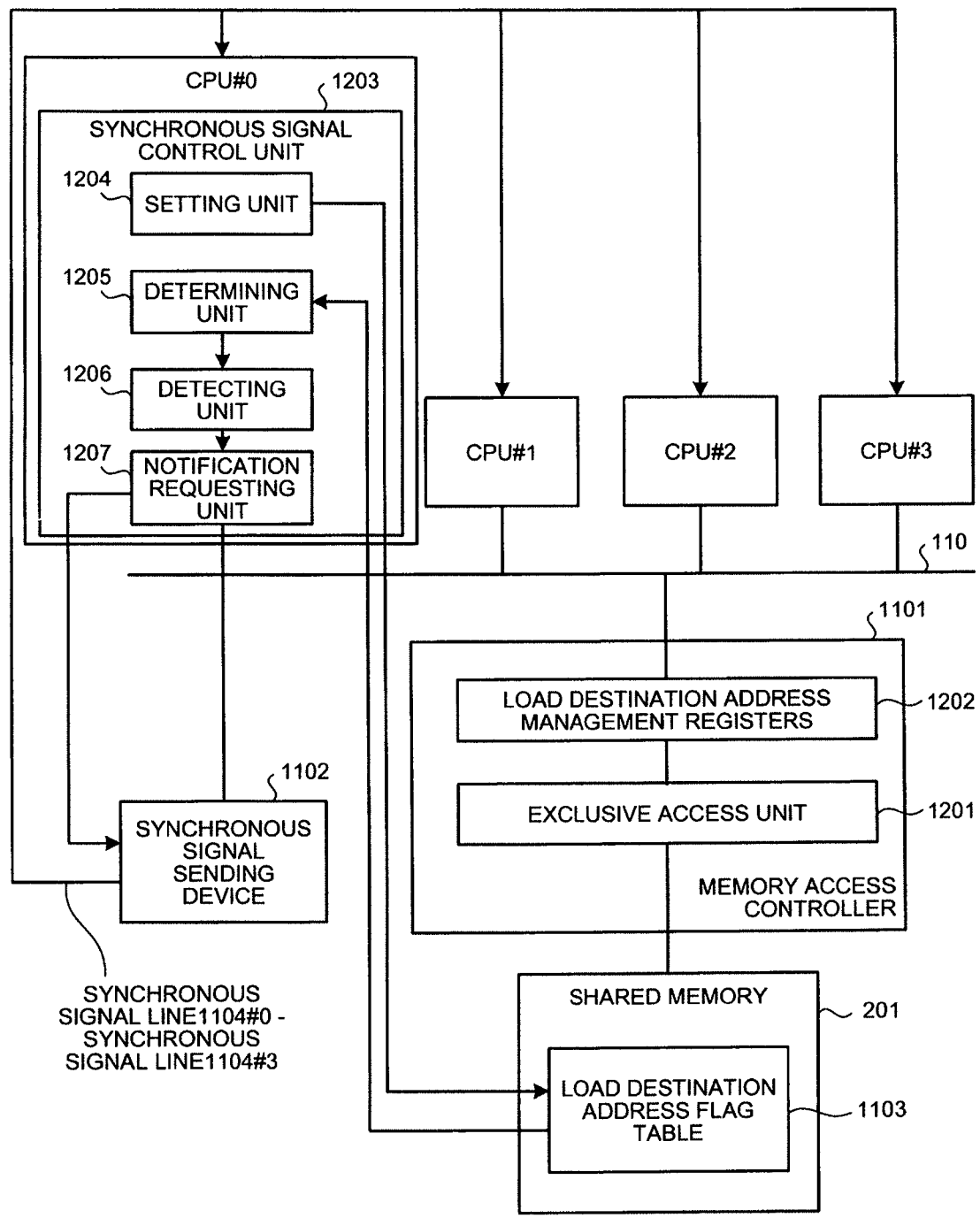

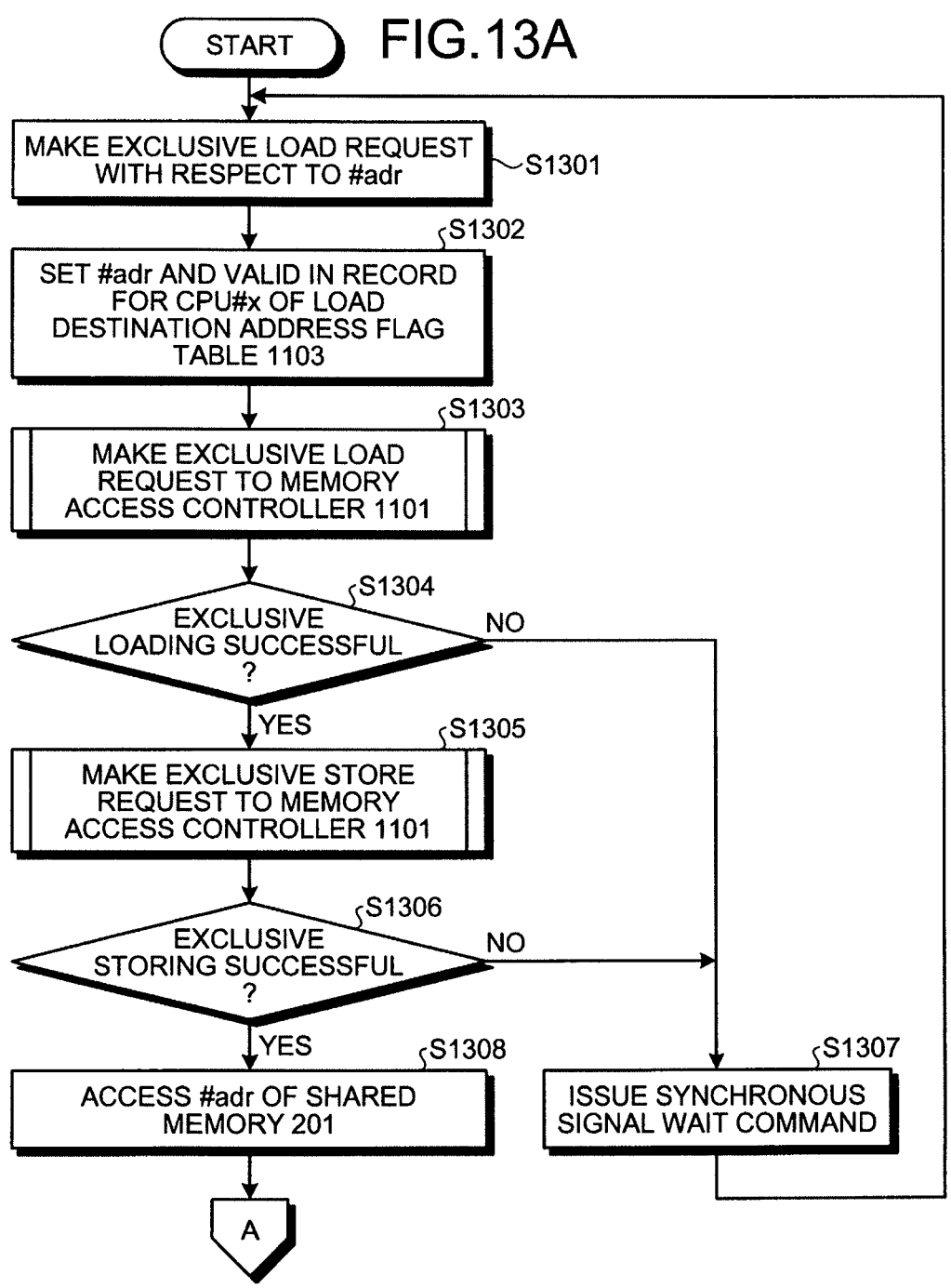

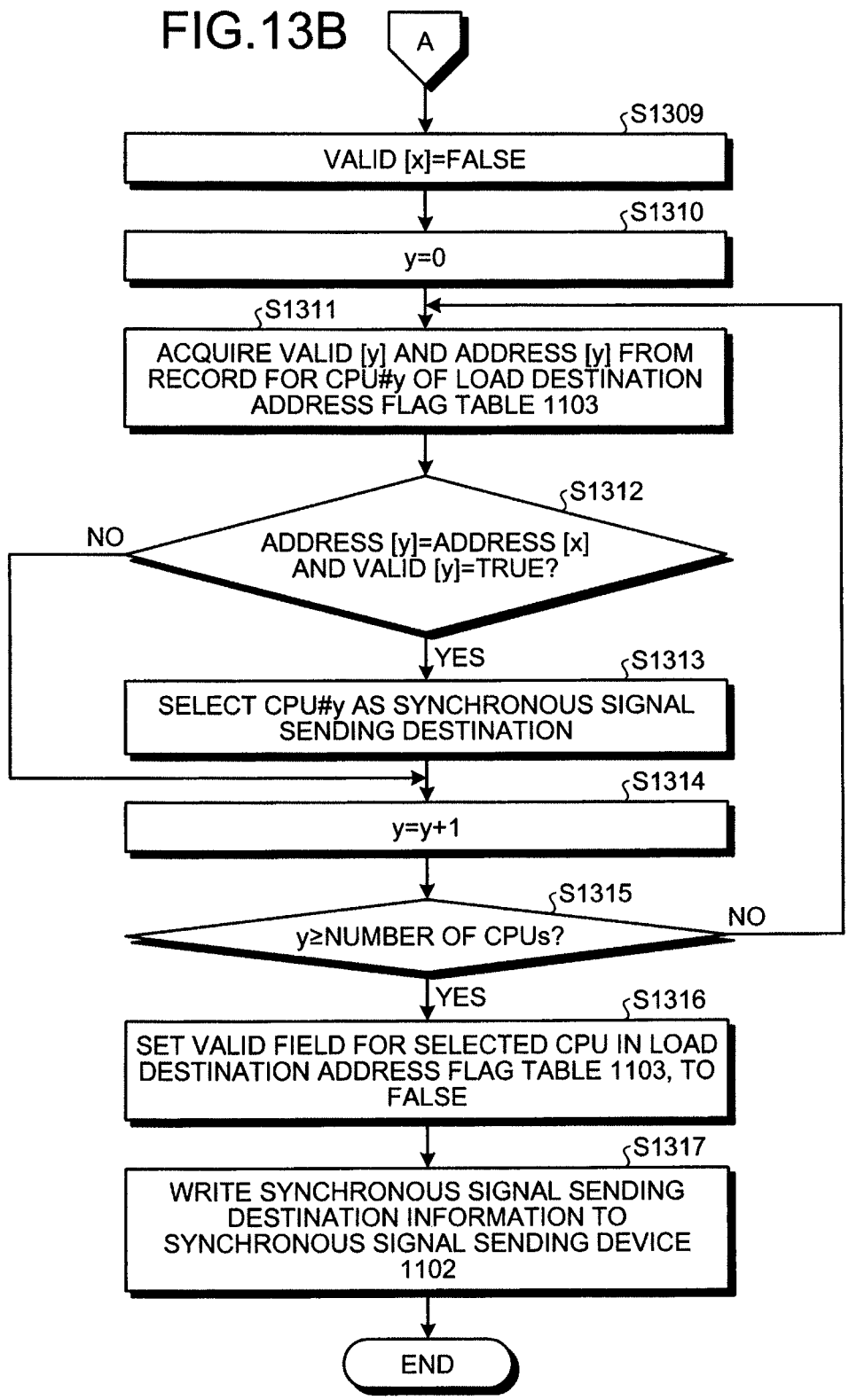

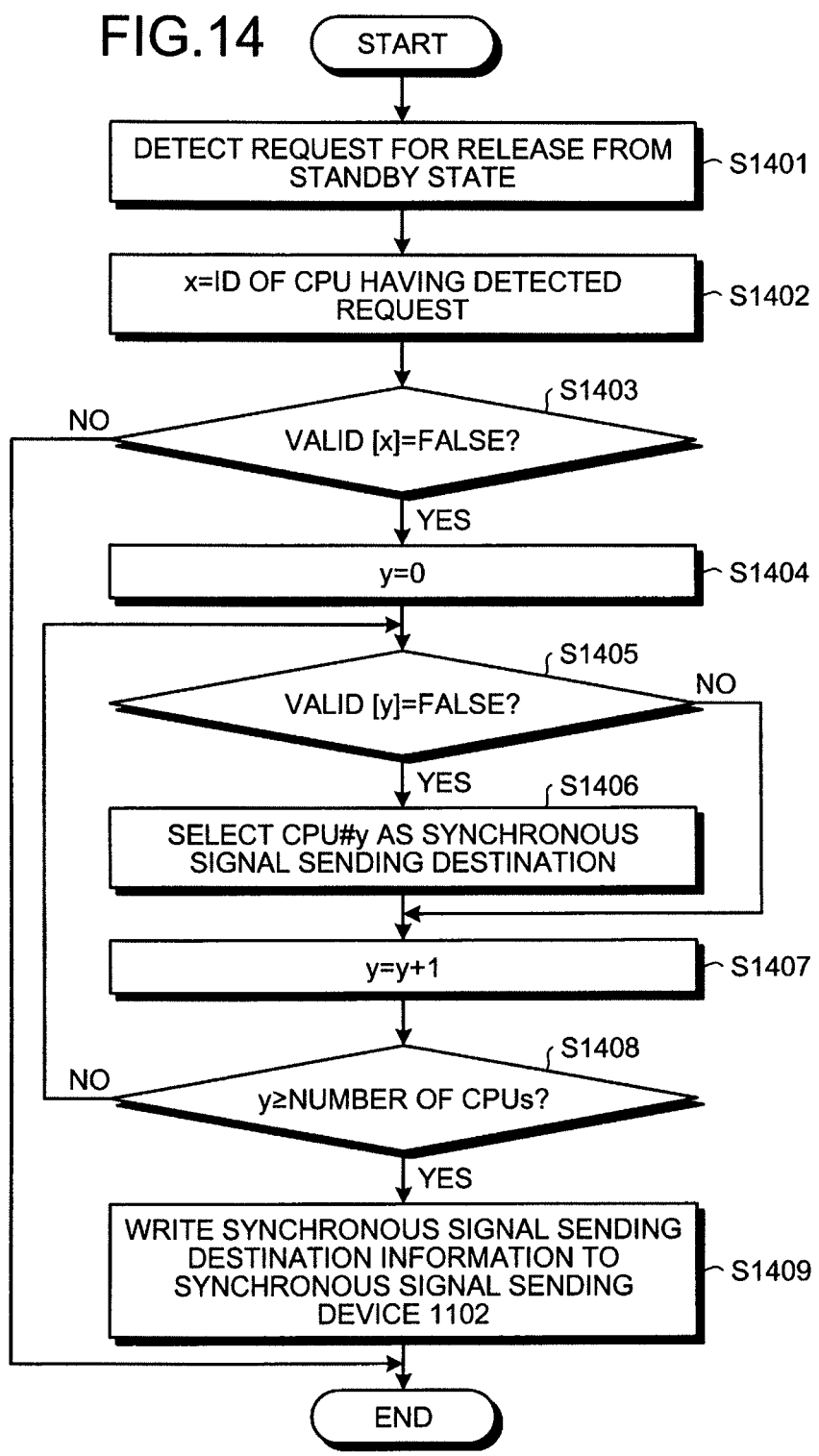

MEMORY ACCESS CONTROLLER, MULTI-CORE PROCESSOR SYSTEM, MEMORY ACCESS CONTROL METHOD, AND COMPUTER PRODUCT

CROSS REFERENCE TO RELATED APPLICATIONS

This application is a continuation application of International Application PCT/JP2010/059700, filed on Jun. 8, 2010 and designating the U.S., the entire contents of which are incorporated herein by reference.

FIELD

The embodiments discussed herein are related to a memory access controller, a multi-core processor system, a memory access control method, and a memory access control program that control memory access.

BACKGROUND

Conventionally, exclusive control over shared data between different cores is important for shared memory multi-core processors. When data is shared among multiple cores and is processed without performing exclusive control, even if the cores execute the same process the same number of times, results may vary depending on the execution timing of the process. One technique of performing exclusive control has been disclosed as a technique of exclusive access to memory.

One example of exclusive access of memory is a method that uses an exclusive load command, an exclusive store command, and an exclusive access mechanism. This method expands the cores command set and bus protocol to enable the issue of special load/store commands on exclusive loading and exclusive storing. In addition, the exclusive access mechanism is disposed on a shared bus connecting multiple cores to shared memory. The exclusive access mechanism has a field recording therein identification information of a CPU that issues an exclusive load command and information of the address and the tag of a load destination, and monitors special load/store commands.

Exclusive access is defined as a state where exclusive storing is performed after exclusive loading is performed. An issuance of an exclusive access request is equivalent to exclusive loading having been performed, and completion of exclusive access is equivalent to exclusive storing having ended.

When an exclusive load command is issued, the exclusive access mechanism performs ordinary loading and returns data to the issuing CPU. The exclusive access mechanism records the address of the load destination. When searching information recorded in the exclusive access mechanism and finding no CPU having the same address as the recorded load destination and for which a tag is recorded in the exclusive access mechanism, the exclusive access mechanism records a tag for the exclusive load command issuing CPU.

When an exclusive store command is issued, if a recorded address associated with an issuing CPU matches the address of a storing destination and a tag is recorded, the exclusive access mechanism issues a store command, returns information indicating successful storage to the issuing CPU, and deletes tag information. Otherwise, the exclusive access mechanism does not issue a store command and executes an operation of returning to the issuing CPU, information indicating failed storage.

Utilization of exclusive loading and exclusive storing enables the matching of results regardless of the timing of processing. For example, when a given CPU performs exclusive loading and exclusive storing of a variable while another CPU performs exclusive loading of the same variable, if the other CPU performing exclusive loading later fails in exclusive storing, no result is reflected. As a result, the CPU having failed in exclusive storing executes the same process over again from exclusive loading, which allows the CPU to use a value properly reflecting the result of processing by the CPU having performed loading first. Hence, results can be matched regardless of timing of processing.

For example, a technique is disclosed, according to which the exclusive access mechanism is realized such that when an exclusive access request is made, a value representing execution of the request is recorded in a register, and when release from exclusive access occurs, the value is cleared from the register (see, e.g., Japanese Laid-Open Patent Publication No. H1-305457 indicated below).

As one method of realizing the exclusive access mechanism, another technique is disclosed, according to which when an exclusive access request is made, exclusive access is performed using information of a CPU ID, memory that is a device with an address to which the exclusive access request is made, I/O, etc. (see, e.g., Published Japanese-Translation of PCT Application, Publication No. 2007/099616 indicated below).

Still another technique is disclosed, according to which the exclusive access mechanism is realized by transmitting a release notification to each CPU when release from exclusive access occurs, and memory traffic is reduced by causing a CPU that has made an exclusive access request and failed to standby until the CPU receives release notification (see, e.g., Japanese Laid-Open Patent Publication No. H8-320828 indicated below).

In this manner, by using the exclusive access mechanism, data shared between different processors are processed properly. The exclusive access mechanism, however, can control an area of data of 32 bits or 64 bits at most, to which the exclusive access mechanism is accessible through one load/store command. OSs or application programs often share data in a larger area, because of which many OSs realize a function called spinlock by utilizing the exclusive access mechanism and thereby, realize exclusive control in a larger area. Overviews of spinlock are described, for example, in "Spinlock—Wikipedia, the free encyclopedia" [online], retrieved Apr. 9, 2010, Internet <URL:http://en.wikipedia.org/wiki/Spinlock> and "pthread spin_lock" [online], retrieved Apr. 9, 2010, Internet <URL:http://www.opengroup.org/onlinepubs/009695399/functions/pthread_spin_lock.htm>, and an example of spinlock is described, for example, in "User-Level Spin Locks—CodeProject" [online], retrieved Apr. 9, 2010, Internet <URL:http://www.codeproject.com/kb/threads/spinlocks.aspx>.

In the case of executing spinlock, a CPU additionally provided with a synchronization command and a synchronization wait command is present so that a CPU having failed in securing an area is caused to standby and is released from standby when becoming able to secure an area (see, e.g., "RealView Compilation Tools Version 3.1 Assembler Guide" [online], retrieved Apr. 9, 2010, Internet <URL:http://info-center.arm.com/help/topic/com.arm.doc.dui0204h/DUI0204H_rvct_assembler_guide.pdf>, p. 4-139, p. 4-140 and "ARM11MPCore Processor Revision: r2p0 Technical Reference Manual" [online], retrieved Apr. 12, 2010, Internet <http://infocenter.arm.com/help/topic/com.arm.doc. ddi0360f/DDI0360F_arm11_mpcore_r2p0_trm.pdf>, p. 11-8). A synchronization command is a command to send a synchronous signal to a different CPU. A synchronization wait command is a command for a CPU to standby until receiving a synchronous signal. In application of this group of commands, a CPU having failed in securing an area issues a synchronization wait command and stands by, while a CPU having succeeded in securing an area sends a synchronous signal to a different CPU after ending exclusive storing. Hence, the CPU having failed in securing the area stands by to wait for a synchronous signal. As a result, access of a memory becomes less frequent, which enables a reduction in power consumption.

Among the above conventional techniques, however, the techniques of the exclusive access mechanism according to Patent documents 1 and 2 pose a problem in that because a synchronous signal is not sent at the timing of the completion of exclusive access, implementing a synchronization command and a synchronization wait command is difficult.

In the technique of the exclusive access mechanism according to Japanese Laid-Open Patent Publication No. H8-320828, a synchronization command and a synchronization wait command can be implemented because a synchronous signal is sent at the timing of the completion of exclusive access. A CPU to which the synchronous signal is to be sent is, however, not identified and thus, the synchronous signal is sent to each CPU. Consequently, a CPU in a standby state according to a synchronization wait command for a purpose other than exclusive access and a CPU having made an exclusive access request to a different area and being in a state of standby are released temporarily from the standby state and then are brought back into the standby state again. Hence, a problem of increased power consumption by CPUs arises.

SUMMARY

According to an aspect of an embodiment, a memory access controller includes a semiconductor circuit configured to classify into a first group of cores having made an exclusive access request to shared memory and a second group of cores not having made an exclusive access request to the shared memory, multiple cores capable of accessing the shared memory; detect a core having completed the exclusive access among the first group of cores; and send to a core among the first group of cores and standing by for the exclusive access, a notification of release from a standby state, when detecting a core having completed the exclusive access.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a block diagram of functional units of the multi-core processor system 100 according to the second embodiment;

FIG. 13A is a flowchart of a synchronous signal control process consequent to exclusive access according to the second embodiment (part 1);

FIG. 13B is a flowchart of the synchronous signal control process consequent to exclusive access according to the second embodiment (part 2); and FIG. 14 is a flowchart of a synchronous signal control process consequent to an event other than exclusive access according to the second embodiment.

DESCRIPTION OF EMBODIMENTS

Preferred embodiments of a memory access controller, a multi-core processor system, a memory access control method, and a memory access control program according to the present invention will be described in detail with reference to the accompanying drawings.

Figure 1:
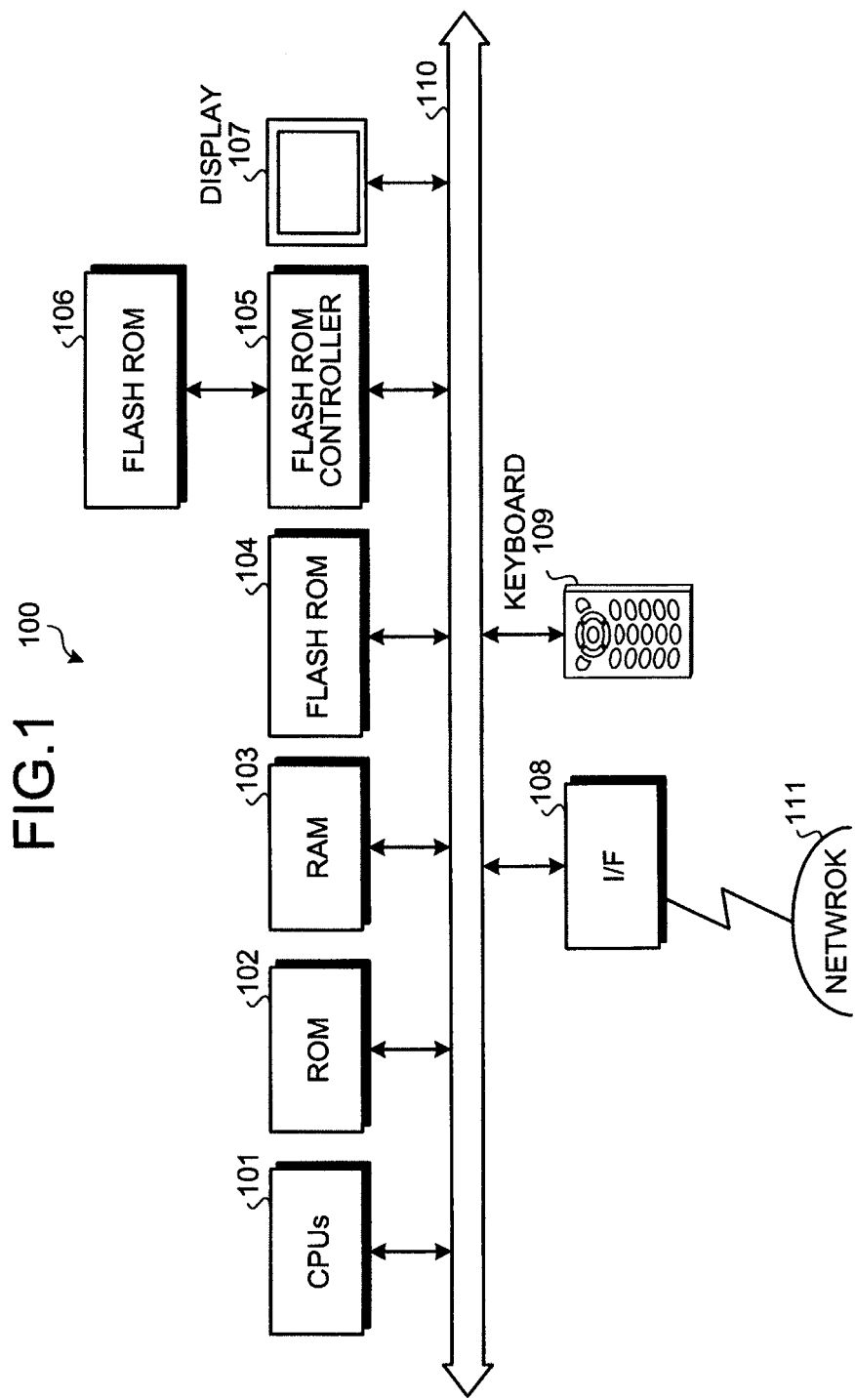
FIG. 1 is a block diagram of a hardware configuration of a multi-core processor system according to embodiments.

FIG. 1 is a block diagram of a hardware configuration of a multi-core processor system according to a first embodiment and a second embodiment. As depicted in FIG. 1, a multi-core processor system 100 includes multiple central processing units (CPUs) 101, read-only memory (ROM) 102, random access memory (RAM) 103, flash ROM 104, a flash ROM controller 105, and flash ROM 106. The multi-core process system includes a display 107, an interface (I/F) 108, and a keyboard 109, as input/output devices for the user and other devices. The components of the multi-core system 100 are respectively connected by a bus 110.

The CPUs 101 govern overall control of the multi-cure processor system 100. The CPUs 101 refer to CPUs that are single core processors connected in parallel. Details of the CPUs 101 of the first embodiment will be described hereinafter with reference to FIG. 2 and of the second embodiment, with reference to FIG. 11. Further, the multi-core processor system 100 is a system of computers that include processors equipped with multiple cores. Provided that multiple cores are provided, implementation may be by a single processor equipped with multiple cores or a group of single-core processors in parallel.

The ROM 102 stores therein programs such as a boot program. The RAM 103 is used as a work area of the CPUs 101. The flash ROM 104 stores system software such as an operating system (OS), and application software. For example, when the OS is updated, the multi-core processor system 100 receives a new OS via the I/F 108 and updates the old OS that is stored in the flash ROM 104 to the received new OS.

The flash ROM controller 105, under the control of the CPUs 101, controls the reading and writing of data with respect to the flash ROM 106. The flash ROM 106 stores therein data written under control of the flash ROM controller 105. Examples of the data include image data and video data received by the user of the multi-core processor system through the I/F 108. A memory card, SD card and the like may be adopted as the flash ROM 106.

The display 107 displays, for example, data such as text, images, functional information, etc., in addition to a cursor, icons, and/or tool boxes. A thin-film-transistor (TFT) liquid crystal display and the like may be employed as the display 107.

The I/F 108 is connected to a network 111 such as a local area network (LAN), a wide area network (WAN), and the Internet through a communication line and is connected to other apparatuses through the network 111. The I/F 108 administers an internal interface with the network 111 and controls the input and output of data with respect to external apparatuses. For example, a modem or a LAN adaptor may be employed as the I/F 108.

The keyboard 109 includes, for example, keys for inputting letters, numerals, and various instructions and performs the input of data. Alternatively, a touch-panel-type input pad or numeric keypad, etc. may be adopted.

Figure 2:
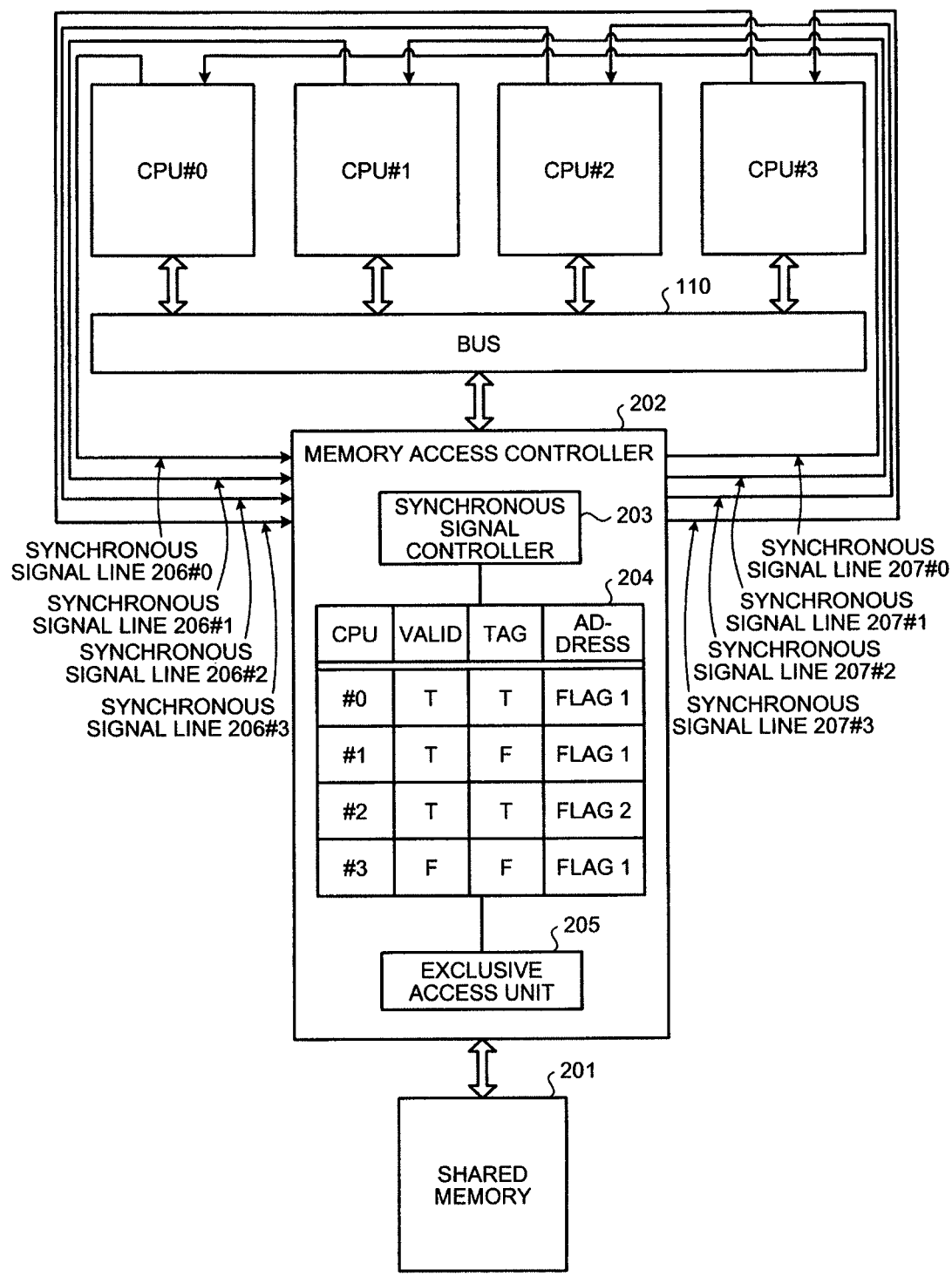
FIG. 2 is a block diagram depicting the relation between CPUs and a memory access controller 202 in the multi-core processor system 100 according to a first embodiment.

FIG. 2 is a block diagram depicting the relation between CPUs and a memory access controller 202 in the multi-core processor system 100 according to a first embodiment. Hardware depicted in FIG. 2 includes a shared memory 201, the memory access controller 202, and a CPU#0 to a CPU#3 making up the CPUs 101. The memory access controller 202 and the CPU#0 to CPU#3 are connected through the bus 110.

The CPU#0 to CPU#3 are connected to the memory access controller 202 not only through the bus 110 but also through synchronous signal lines 206 and synchronous signal lines 207. For example, the CPU#0 sends a synchronous signal to the memory access controller 202 through a synchronous signal line 206#0. The memory access controller 202 sends a synchronous signal to the CPU#0 through a synchronous signal line 207#0.

In the same manner, the CPU#1 to CPU#3 send a synchronous signal to the memory access controller 202 through the synchronous signal lines 206#1 to 206#3, respectively. The memory access controller 202 sends a synchronous signal to the CPU#1 to CPU#3 through the synchronous signal lines 207#1 to 207#3, respectively.

The shared memory 201 is a memory area that can be accessed through the memory access controller 202. The memory area is provided as, for example, the ROM 102, the RAM 103, and the flash ROM 104. For example, when the CPU#0 requests the display 107 to display image data, the CPU#0 accesses a video RAM (VRAM) included in the RAM 103 and writes the image data to the VRAM. Accessing the VRAM, therefore, may be inclusively regarded as accessing the shared memory 201. A memory of a resource connected to the I/F 108 may also be inclusively regarded as the shared memory 201. In this manner, in the multi-core processor system 100, the memory of devices accessed by the CPU#0 to CPU#3 may be inclusively regarded as the shared memory 201.

The memory access controller 202 has a conventional exclusive access mechanism and serves as an apparatus that provides the CPU#0 to CPU#3 with a function of making exclusive access of the shared memory 201. The exclusive access function has an exclusive load command and an exclusive store command. An exclusive load command issued in the memory access controller 202 includes an additional process of recording that an exclusive access request has been made.

The memory access controller 202 includes a synchronous signal control unit 203, load destination address management flag registers 204, and an exclusive access unit 205. The synchronous signal control unit 203 controls the sending destinations of synchronous signals output from the synchronous signal lines 207#0 to the synchronous signal line 207#3, based on incoming synchronous signals from the synchronous signal lines 206#0 to the synchronous signal line 206#3 and on the load destination address management flag registers 204.

The load destination address management flag registers 204 are a group of registers accessed by the synchronous signal control unit 203 and the exclusive access unit 205. The load destination address management flag registers 204 are provided for the CPU#0 to the CPU#3 as load destination address management flag registers 204#0 to 204#3 corresponding to the CPU#0 to the CPU#3, respectively. The load destination address management flag register 204 has a Valid field, a tag field, and an address field. When any one of the CPU#0 to the CPU#3 performs exclusive loading, TRUE is entered in the Valid field as a value indicating exclusive loading having been performed, regardless of whether exclusive loading is successful or not. When exclusive loading is not performed, FALSE is stored in the Valid field. Hereinafter, TRUE is written as "T" and FALSE is written as "F" in FIGS. 2, 4 to 6, and 11.

When any one of the CPU#0 to the CPU#3 performs exclusive loading and succeeds in acquiring a right to execute exclusive storing, TRUE is entered in the tag field as a value indicating a success in acquiring the right to execute exclusive storing. When the CPU fails in acquiring the right to execute exclusive storing or does not try to acquire the right to execute exclusive storing, FALSE is entered in the tag field. Following execution of exclusive storing by the CPU having succeeded in acquiring the right to execute exclusive storing, a value for the tag field is reset to an initial value.

A value for a flag associated with an address to which exclusive access is made is entered in the address field. For example, when a shared area 1 and a shared area 2 are present in the shared memory 201, an OS prepares a flag 1 corresponding to the shared area 1 and a flag 2 corresponding to the shared area 2. Exclusive control is thus performed in such a way that a CPU having acquired the flag 1 is allowed to use the shared area 1 and a CPU having acquired the flag 2 is allowed to use the shared area 2. The size of each field is determined such that 1 bit is allocated for the Valid field, 1 bit for the tag field, and 32 bits for the address field. Entering 1 in the Valid field and in the tag filed is defined as entering TRUE in both fields, and entering 0 is defined as entering FALSE.

For example, in the load destination address management flag register 204#0 depicted in FIG. 2, TRUE is entered in the Valid field and in the tag field while the flag 1 is entered in the address field, indicating that the CPU#0 has acquired an exclusive store right for the shared area corresponding to the flag 1. In the same manner, in the load destination address management flag register 204#1, TRUE is entered in the Valid field, FALSE is in the tag field, and the flag 1 is in the address field, indicating that the CPU#1 has failed in acquiring an exclusive store right for the shared area corresponding to the flag 1.

In the load destination address management flag register 204#2, TRUE is entered in the Valid field and in the tag field while the flag 2 is entered in the address field, indicating that the CPU#2 has acquired an exclusive store right for the shared area corresponding to the flag 2. Finally, in the load destination address management flag register 204#3, FALSE is entered in the Valid field and in the tag field while the flag 1 is entered in the address field, indicating that the CPU#3 has already completed exclusive storing in the shared area corresponding to the flag 1.

The exclusive access unit 205 has a function of executing an exclusive load process and an exclusive store process based on the load destination address management flag registers 204 when an exclusive load command and an exclusive store command are issued from any one of the CPU#0 to the CPU#3. The exclusive access unit 205 updates the load destination address management flag registers 204 through the exclusive load process and the exclusive store process. Processing will be described later, with reference to FIGS. 8 and 9.

Figure 3:
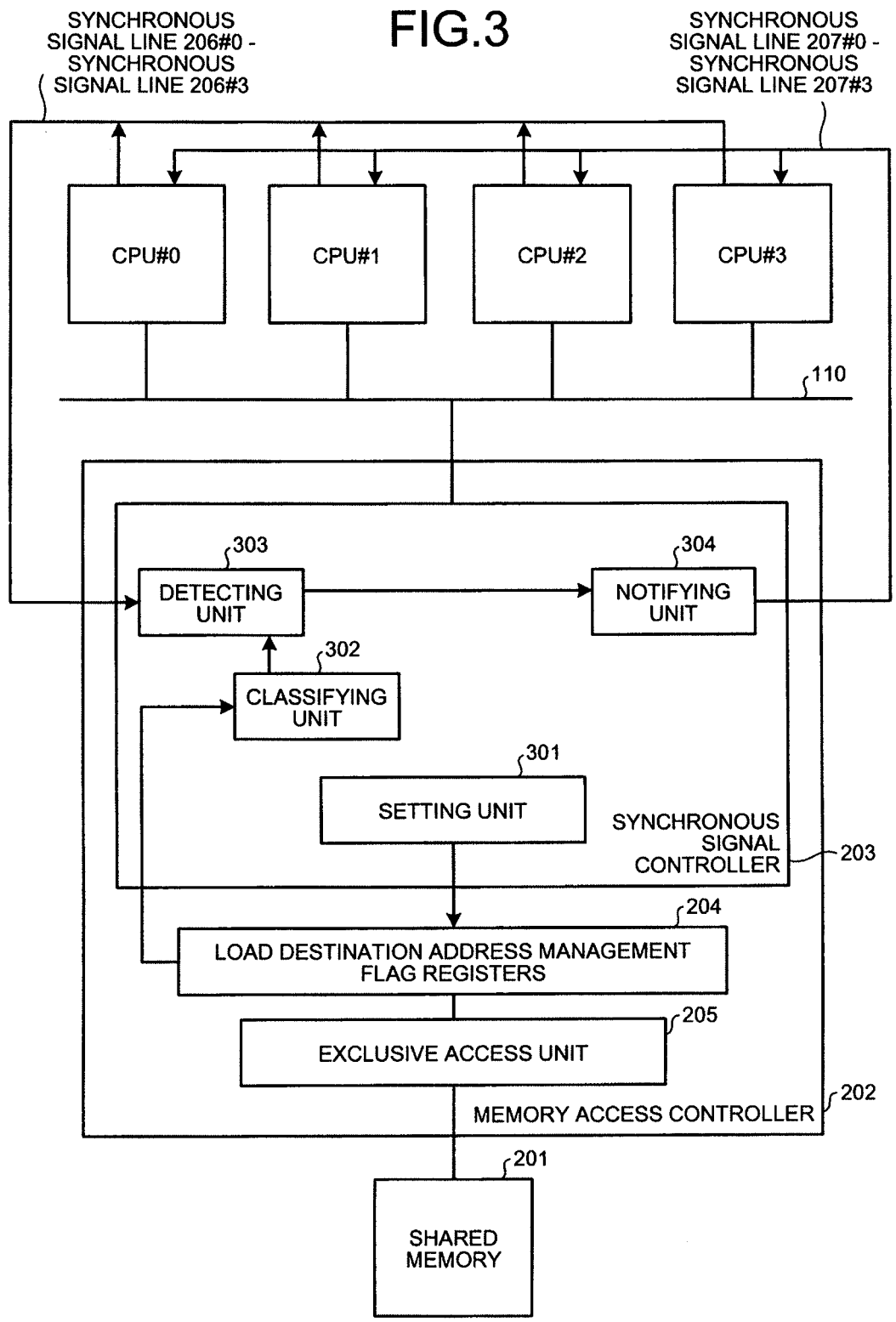
FIG. 3 is a block diagram of functional units of the memory access controller 202 according to the first embodiment.

Functional units of the memory access controller 202 will be described. FIG. 3 is a block diagram of functional units of the memory access controller 202 according to the first embodiment. The memory access controller 202 includes a setting unit 301, a classifying unit 302, a detecting unit 303, and a notifying unit 304. These functional units (setting unit 301 to notifying unit 304) serve as a controller and are realized by a semiconductor circuit implemented on the memory access controller 202.

The setting unit 301 has a function of updating a value in the load destination address management flag registers 204. For example, when the exclusive load process is executed, the setting unit 301 changes a value for the Valid field of the load destination address management flag register 204 from FALSE to TRUE.

The classifying unit 302 has a function of classifying into a first group of cores having made an exclusive access request to the shared memory 201 and a second group of cores not having made an exclusive access request to the shared memory 201, cores capable of accessing the shared memory 201. The cores mean are CPUs. The classifying unit 302 may classify the cores into a first group of cores having made an exclusive access request to a specific area of the shared memory 201 and a second group of cores not having made an exclusive access request to the specific area of the shared memory 201. The specific area is a shared area of the shared memory 201. The entire address space of the shared memory 201 may be used as the shared area, or a partial address space of the shared memory 201 may be used as the shared area so that multiple shared areas are present in the shared memory 201.

For example, when a value for the Valid field of the load destination address management flag register 204 is TRUE, the classifying unit 302 classifies the corresponding core into the first group of cores having made an exclusive access request, and when the value is FALSE, the classifying unit 302 classifies the corresponding core into the second group of cores not having made an exclusive access request. The result of the classification is stored to a register, RAM, etc., of the memory access controller 202.

The detecting unit 303 has a function of detecting a core having completed exclusive access among the first group of cores classified by the classifying unit 302. The detecting unit 303 may detect a core having sent a notification of release from the standby state, as a core having completed exclusive access among the first group of cores. A core having sent a notification of release from the standby state is a CPU having sent a synchronous signal based on a synchronization command. For example, when a synchronous signal is sent from the synchronous signal line 206#0 and TRUE is set in the Valid field of the load destination address management flag register 204#0, the detecting unit 303 detects the CPU#0 as a CPU having completed exclusive access. The result of the detection is stored in the register, RAM, etc., of the memory access controller 202.

The detecting unit 303 may detect a core having sent a notification of release from the standby state, among the second group of cores classified by the classifying unit 302 as cores not having made an exclusive access request. For example, when a synchronous signal is sent from the synchronous signal line 206#0 and FALSE is set in the Valid field of the load destination address management flag register 204#0, the detecting unit 303 detects the CPU#0 as a CPU having sent a notification of release from the standby state. A case where a synchronous signal is sent when FALSE is set in the Valid field is a case where a synchronous signal is sent for a purpose other than exclusive access. A case where a synchronous signal is sent for a purpose other than exclusive access is a case of executing a barrier synchronization process. The details of the barrier synchronization process will be described later, with reference to FIG. 6.

The notifying unit 304 has a function of sending a notification of release from the standby state to a core standing by for exclusive access among the first group of cores when the detecting unit 303 detects a core having completed exclusive access. When the detecting unit 303 detects a core having completed exclusive access, the notifying unit 304 may send a notification of release from the standby state to cores excluding the core having completed exclusive access from the first group of cores.

For example, when the CPU#0 is detected as a CPU having completed exclusive access, the notifying unit 304 sends a synchronous signal to the first group of cores for which a value for the Valid field is TRUE.

When the detecting unit 303 detects a core having sent a notification of release from the standby state among the second group of cores not having made an exclusive access request, the notifying unit 304 may send a notification of release from the standby state to cores excluding the core having sent the notification of release from the standby state from the second group of cores. For example, a case is assumed where the detecting unit 303 detects the CPU#1 as a CPU having sent a notification of release from the standby state and detects the CPU#1 and the CPU#3 for which the Valid fields are set to FALSE as the second group of cores. In this case, the notifying unit 304 sends a notification of release from the standby state to the CPU#3 excluding the CPU#1 from the second group of cores. Information of sending the notification may be stored to a register, RAM, etc., of the memory access controller 202.

Figure 4:
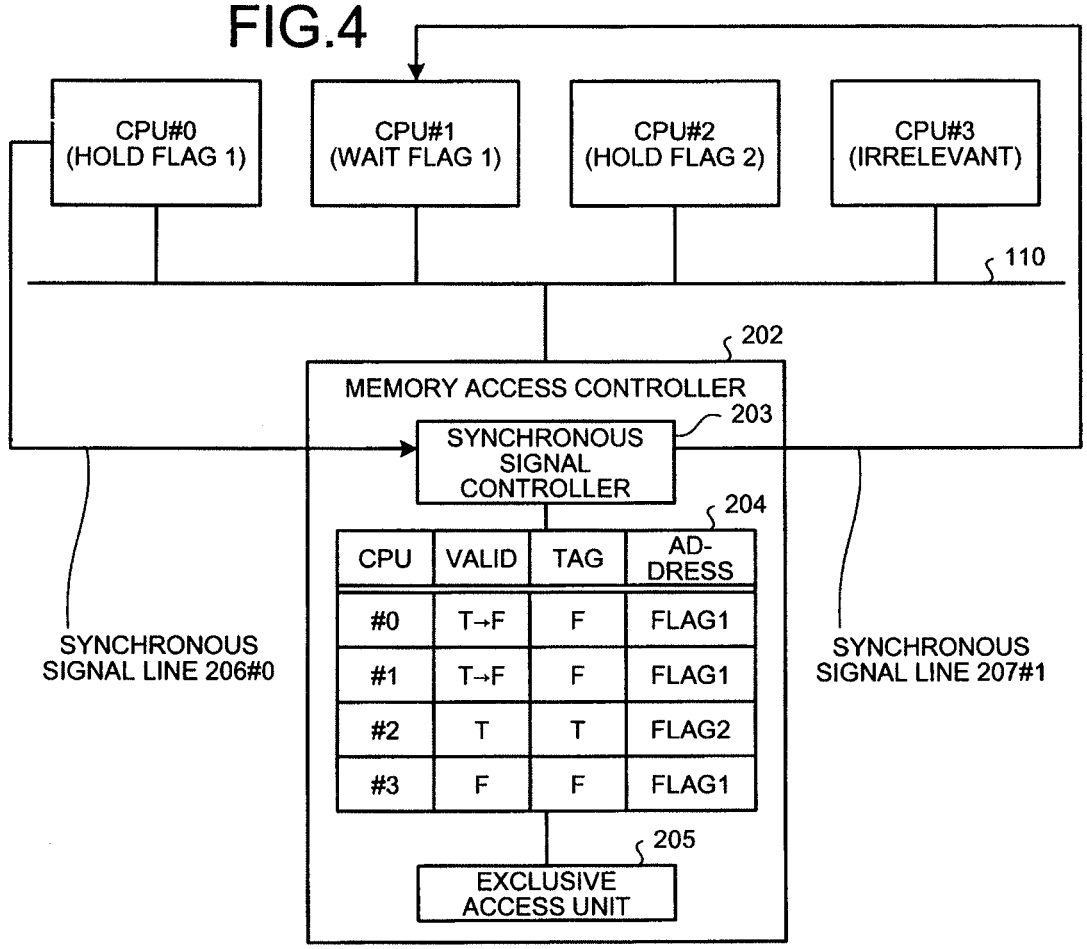
FIG. 4 is an explanatory diagram of an overview of operation in a case where a CPU making an exclusive access request to the memory access controller 202 is present.

FIG. 4 is an explanatory diagram of an overview of operation in a case where a CPU making an exclusive access request to the memory access controller 202 is present. According to the contents of the load destination address management flag register 204 for the CPU#0 to CPU#3 of FIG. 4, the CPU#0 has acquired an exclusive store right for the shared area corresponding to the flag 1 and has performed exclusive storing; the CPU#1 has failed in acquiring an exclusive store right for the shared area corresponding to the flag 1 and is standing by to wait for a synchronous signal; the CPU#2 has acquired an exclusive store right for the shared area corresponding to the flag 2; and the CPU#3 is unrelated to the accessing of the shared area.

A case is assumed where the CPU#0 sends a synchronous signal to the synchronous signal control unit 203 through the synchronous signal line 206#0. Receiving the synchronous signal, the synchronous signal control unit 203 detects a register meeting conditions that a value for the address field matches a value for the address field of the load destination address management flag register 204#0 and TRUE, which indicates exclusive loading having been performed, is entered in the Valid field. In FIG. 4, the load destination address management flag register 204#1 meets such conditions. The synchronous signal control unit 203, therefore, sends a synchronous signal to the CPU#1 through the synchronous signal line 207#1.

After sending the synchronous signal, the synchronous signal control unit 203 changes the values in the Valid fields of the load destination address management flag register 204#0 and in the load destination address management flag register 204#1, from TRUE to FALSE. Having received the synchronous signal, the CPU#1 is released from a state of waiting for a synchronous signal and performs exclusive loading onto the shared area corresponding to the flag 1.

Figure 5:
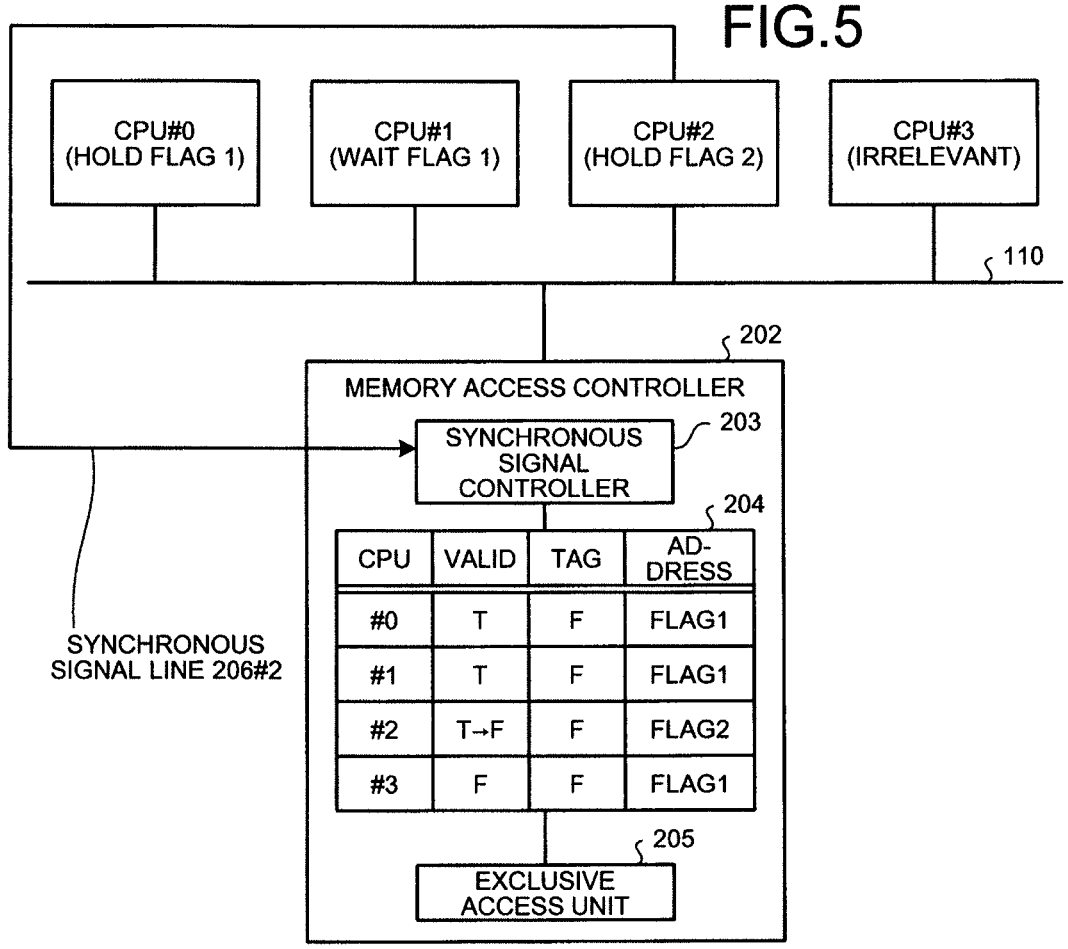
FIG. 5 is an explanatory diagram of an overview of operation in a case where a CPU making an exclusive access request to the memory access controller 202 is not present.

FIG. 5 is an explanatory diagram of an overview of operation in a case where a CPU making an exclusive access request to the memory access controller 202 is not present. Because the load destination address management flag registers 204 depicted in FIG. 5 have the contents as the load destination address management flag registers 204 depicted in FIG. 4, the states of the CPU#0 to CPU#3 in FIG. 5 are the same as the states of the CPU#0 to CPU#3 in FIG. 4, and description thereof is omitted.

A case is assumed where the CPU#2 sends a synchronous signal to the synchronous signal control unit 203 through the synchronous signal line 206#2. Receiving the synchronous signal, the synchronous signal control unit 203 detects a register meeting conditions that a value in the address field matches a value in the address field of the load destination address management flag register 204#2 and TRUE, which indicates exclusive loading having been performed, is entered in the Valid field. In FIG. 5, no load destination address management flag register 204 meeting such conditions is present. The synchronous signal control unit 203, therefore, does not send a synchronous signal to any of the CPU#0 to CPU#3.

The synchronous signal control unit 203 changes the value in the Valid field of the load destination address management flag register 204#2, from TRUE to FALSE. As described above, the operation of the memory access controller 202 depicted in FIGS. 4 and 5 is consequent to exclusive access, whereby the synchronous signal control unit 203 executes a synchronous signal control process that is consequent to an exclusive access event.

Figure 6:
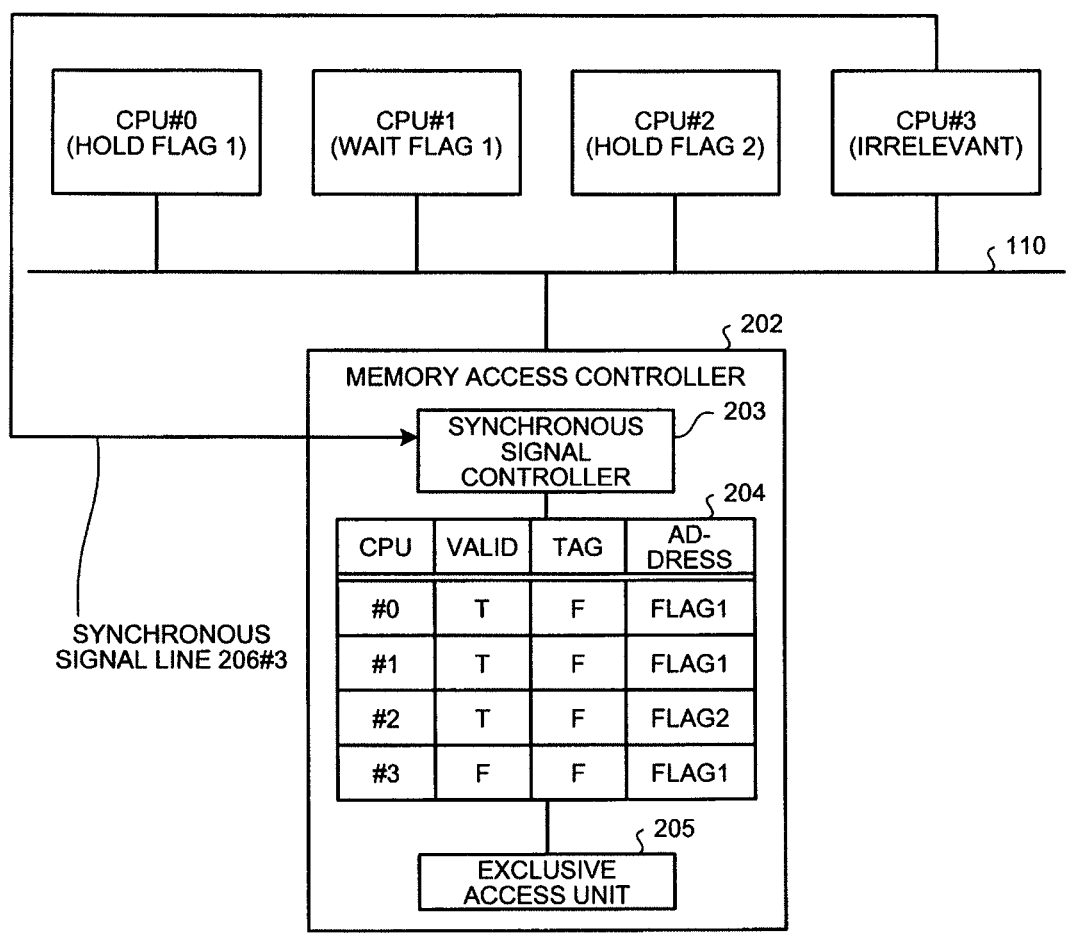
FIG. 6 is an explanatory diagram of an overview of operation in a case where Valid information is not set in the memory access controller 202.

FIG. 6 is an explanatory diagram of an overview of operation in a case where Valid information is not set in the memory access controller 202. Because the load destination address management flag registers 204 in FIG. 6 have the same contents as the load destination address management flag registers 204 in FIG. 4, the states of the CPU#0 to CPU#3 in FIG. 6 are the same as the states of the CPU#0 to CPU#3 in FIG. 4, and description thereof is omitted.

A case is assumed where the CPU#3 outputs a synchronous signal to the synchronous signal control unit 203 through the synchronous signal line 206#3. Receiving the synchronous signal, the synchronous signal control unit 203 determines the received synchronous signal to be a synchronous signal for a purpose other than exclusive access consequent to TRUE not being entered in the Valid field of the load destination address management flag register 204#3. The synchronous signal control unit 203 thus searches for a register meeting a condition that TRUE is not entered in the Valid field, and when finding a register, sends a synchronous signal to the corresponding CPU. In FIG. 6, no load destination address management flag register 204 meeting such a condition is present. The synchronous signal control unit 203, therefore, does not send a synchronous signal to any of the CPU#0 to CPU#3.

A synchronous signal is sent for a purpose other than exclusive access in a case of, for example, distributed processing by multiple CPUs where completion of processes by all the CPUs is confirmed and then the next process is started. Each CPU executes a barrier synchronization process, which is a wait-queuing process, until the CPUs complete the processes as a whole.

For example, a case is assumed where the CPU#1 and the CPU#3 execute distributed processes and the next process is started when both CPU complete the processes, respectively. If the CPU#1 completes processing first and determines based on memory contents, etc., that the CPU#3 is still executing a process, the CPU#1 issues a synchronous signal wait command. Here, because the CPU#1 does not perform exclusive loading, TRUE is not entered in the Valid field of the load destination address management flag register 204#1. Subsequently, when the CPU#3 completes processing and determines based on memory contents, etc., that the CPU#1 has already completed processing, the CPU#3 sends a synchronous signal to the memory access controller 202.

Receiving the synchronous signal, the memory access controller 202 determines the received synchronous signal to be a synchronous signal for a purpose other than exclusive access consequent to TRUE not being entered in the Valid field of the load destination address management flag register 204#3. The memory access controller 202 thus sends a synchronous signal to the CPU#1. As a result, the CPU#1 is released from the state of waiting for a synchronous signal, enabling both the CPU#1 and the CPU#3 to proceed to the next process.

As described, the operation of the memory access controller 202 depicted in FIG. 6 is consequent to an event other than exclusive access, and the synchronous signal control unit 203 executes a synchronous signal control process consequent to an event other than exclusive access.

Figure 7:
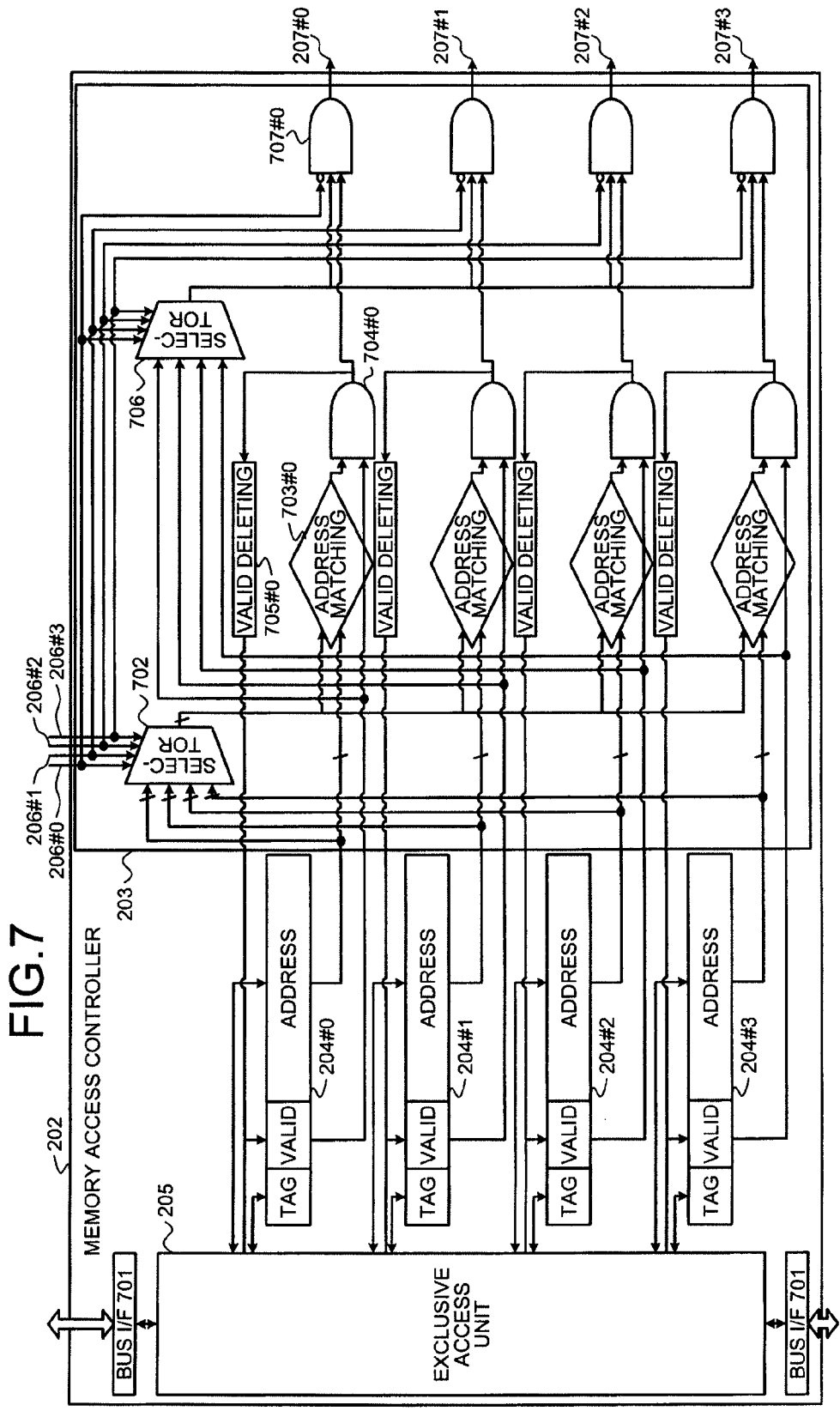
FIG. 7 is an explanatory diagram of wiring of the memory access controller 202 according to the first embodiment.

FIG. 7 is an explanatory diagram of wiring of the memory access controller 202 according to the first embodiment. The memory access controller 202 depicted in FIG. 7 executes the operations depicted in FIGS. 4 and 5. The exclusive access unit 205 receives an exclusive load command and an exclusive store command through a bus I/F 701, and accesses the shared memory 201. The exclusive access unit 205 updates a value in the load destination address management flag registers 204. This updating by the exclusive access unit 205 is equivalent to the function of the setting unit 301. When receiving a synchronous signal sent via any one of the synchronous signal lines 206#0 to 206#3, a selector 702 outputs a value for the corresponding address field. For example, when a synchronous signal is sent from the synchronous signal line 206#0, the selector 702 outputs a value for the address field of the load destination address management flag register 204#0.

An address match block 703 compares a value output from the selector 702 with a value for the address field of a load destination address management flag register 204 and outputs TRUE or FALSE. The selector 702 and the address match block 703 are equivalent in function to the classifying unit 302. For example, if the output value matches the value for the address field of the load destination address management flag register 204, the address match block 703 outputs TRUE. If TRUE is output, the corresponding CPU belongs to the first group. If the output value is different from the value for the address field of the load destination address management flag register 204, the address match block 703 outputs FALSE. If FALSE is output, the corresponding CPU belongs to the second group.

For example, an address match block 703#0 compares a value output from the selector 702 with a value for the address field of the load destination address management flag register 204#0 and outputs TRUE or FALSE.

An AND circuit 704 outputs TRUE if a value output from the address match block 703 and a value for the Valid field are both TRUE. For example, an AND circuit 704#0 outputs TRUE if a value output from the address match block 703#0 and a value for the Valid field of the load destination address management flag register 204#0 are both TRUE. A Valid deleting block 705 sets the Valid field to FALSE when receiving a TRUE signal.

The selector 706 outputs a value for the Valid field corresponding to a synchronous signal line from which a synchronous signal is sent, among the synchronous signal lines 206#0 to 206#3. The AND circuit 704 and the selector 706 are equivalent in function to the detecting unit 303. For example, when a synchronous signal is sent from the synchronous signal line 206#0, the selector 706 outputs a value for the Valid field of the load destination address management flag register 204#0. Hence, if a synchronous signal is received and a value for the Valid field is TRUE, the corresponding CPU is detected as a CPU having completed exclusive access.

The AND circuit 707 outputs TRUE if values output from the AND circuit 704 and selector 706 are both TRUE and no synchronous signal is sent from the corresponding synchronous signal line among the signal line 206#0 to the synchronous signal line 206#3. The AND circuit 707 is equivalent in function to the notifying unit 304. If an output value from the AND circuit 707 is TRUE, the corresponding CPU is in a state of standby for exclusive access. The AND circuit 707 thus sends a synchronous signal through the synchronous signal line corresponding to the CPU among the signal line 206#0 to the synchronous signal line 206#3. For example, the AND circuit 707#0 sends a synchronous signal through the synchronous signal line 207#0 if values output from the AND circuit 704#0 and selector 706 are both TRUE and no synchronous signal is sent from the synchronous signal line 206#0.

Figure 8:
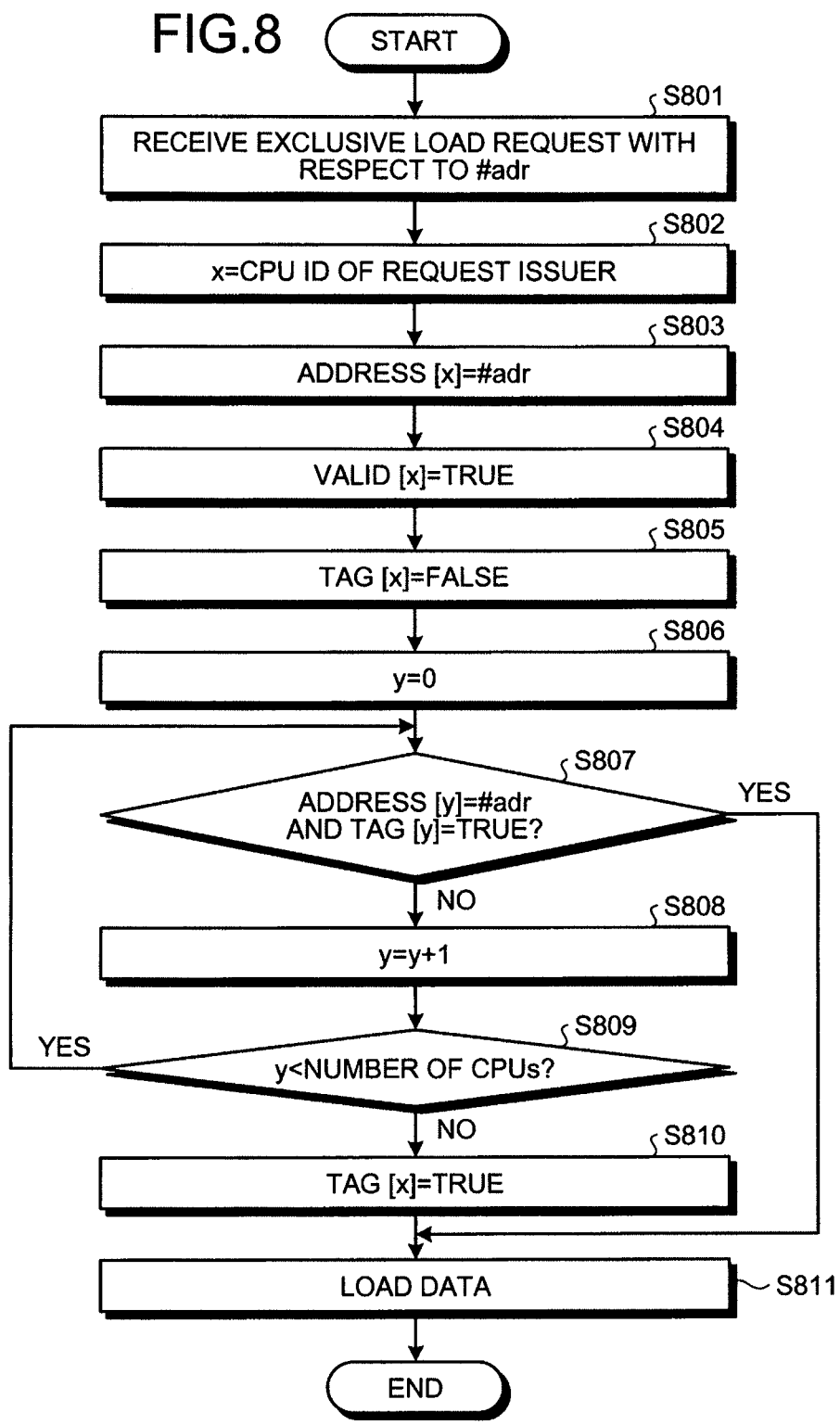
FIG. 8 is a flowchart of an exclusive load process by the exclusive access unit 205 according to the first embodiment.
Figure 9:
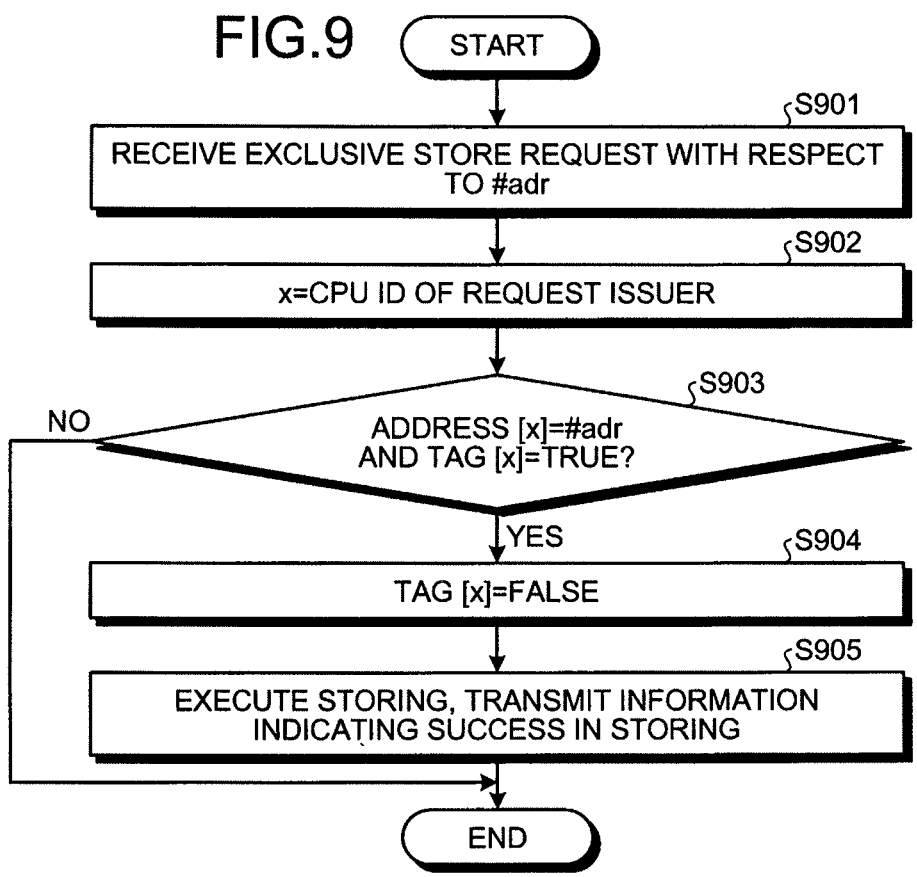
FIG. 9 is a flowchart of an exclusive store process by the exclusive access unit 205 according to the first embodiment.
Figure 10:
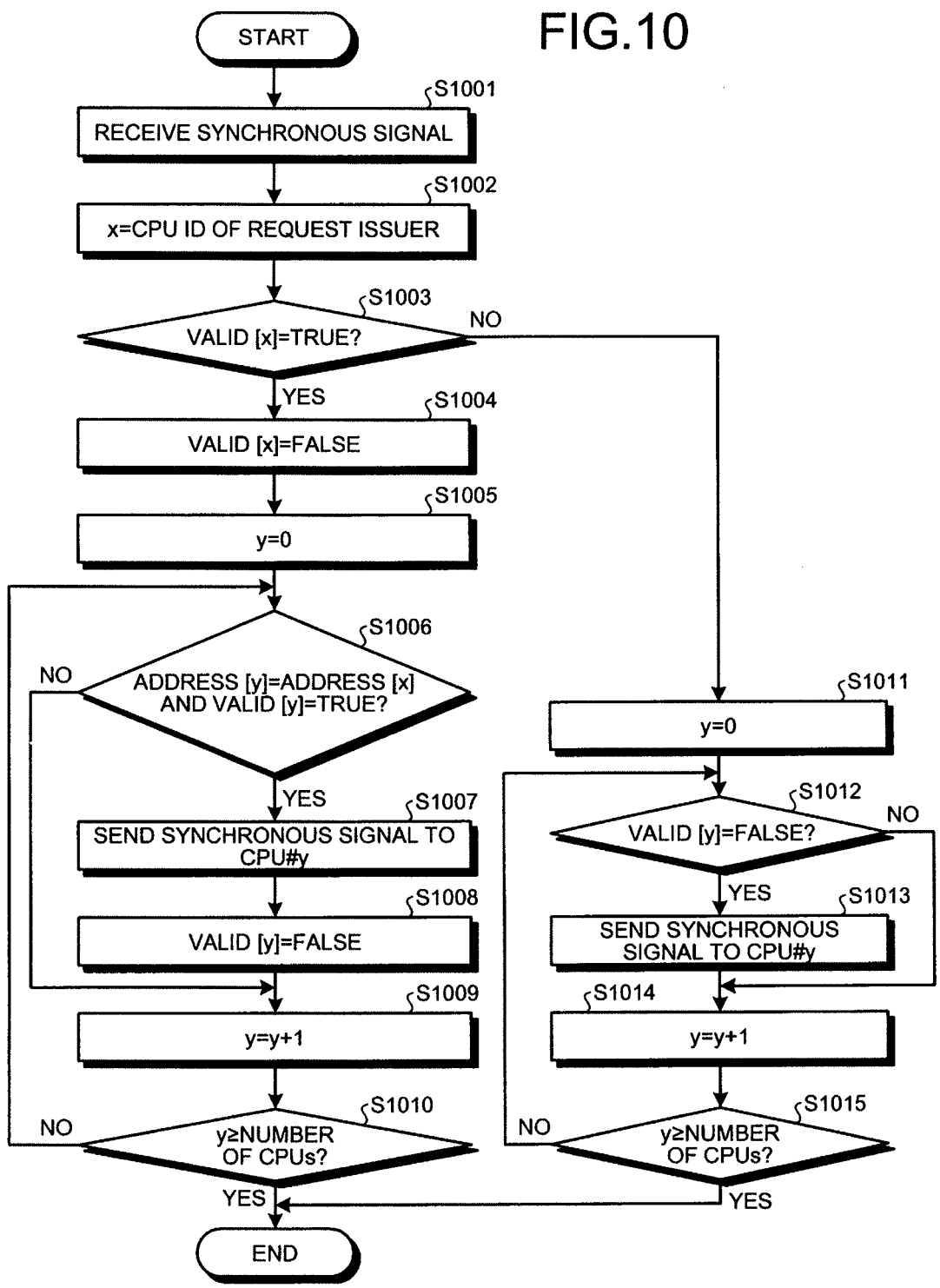
FIG. 10 is a flowchart of a synchronous signal control process according to the first embodiment.

FIG. 8 is a flowchart of an exclusive load process by the exclusive access unit 205 according to the first embodiment. In FIGS. 8 to 10, 13A, 13B, and 14, 1 entered into a field represents TRUE and 0 represents FALSE. Terms "Valid [x]", "tag [x]", and "address [x]" used in FIGS. 8 to 10 represent the Valid field, the tag field, and the address field of the load destination address management flag register 204#0x, respectively.

The memory access controller 202 receives an exclusive load request to #adr from any one of the CPU#0 to CPU#3 (step S801). #adr represents a flag corresponding to a shared area in the shared memory 201.

After receiving the exclusive load request, the memory access controller 202 sets the CPU ID of an exclusive load request issuer as a variable x (step S802). For example, the memory access controller 202 sets 0 as the variable x when receiving an exclusive load request from the CPU#0, and sets 3 as the variable x when receiving an exclusive load request from the CPU#3. After setting a value as the variable x, the memory access controller 202 enters #adr in the address [x] (step S803), TRUE in the Valid [x] (step S804), and FALSE in the tag [x] (step S805).

The memory access controller 202 sets 0 as a variable y (step S806). After setting 0 as the variable y, the memory access controller 202 determines whether the value for an address [y] is #adr and the value for a tag [y] is TRUE (step S807). If the value for the address [y] is not #adr or the value for the tag [y] is FALSE (step S807: NO), the memory access controller 202 increases the variable y by 1 (step S808). Subsequently, the memory access controller 202 determines whether the variable y is less than the number of CPUs (step S809). If the variable y is less than the number of CPUs (step S809: YES), the memory access controller 202 proceeds to the process of step S807.

If the variable y is greater than or equal to the number of CPUs (step S809: NO), the memory access controller 202 enters TRUE in the tag [x] (step S810). After entering TRUE in the tag [x], the memory access controller 202 loads data onto a shared area corresponding to #adr (step S811), and ends the exclusive load process. If the value for the address [y] is #adr or the value for the tag [y] is TRUE (step S807: YES), the memory access controller 202 proceeds to the process of step S811. A state of having executed the process of step S810 is equivalent to a state of having acquired an exclusive store right, while a state of having executed the process of (step S807: YES) is equivalent to a state of failing in acquiring an exclusive store right.

FIG. 9 is a flowchart of an exclusive store process by the exclusive access unit 205 according to the first embodiment. The memory access controller 202 receives an exclusive store request to #adr from any one of the CPU#0 to CPU#3 (step S901). After receiving the exclusive store request, the memory access controller 202 sets the CPU ID of an exclusive store request issuer as the variable x (step S902).

After setting the CPU ID as the variable x, the memory access controller 202 determines whether the value for the address [x] is #adr and the value for the tag [x] is TRUE (step S903). If the value for the address [x] is #adr and the value for the tag [x] is TRUE (step S903: YES), the memory access controller 202 enters FALSE in the tag [x] (step S904). After entering FALSE, the memory access controller 202 stores a shared area corresponding to #adr, transmits to the CPU#x, information indicating success in storing (step S905), and ends the exclusive store process. If the value for the address [x] is not #adr or the value for the tag [x] is FALSE (step S903: NO), the memory access controller 202 determines that exclusive storing has failed, and ends the exclusive store process.

FIG. 10 is a flowchart of a synchronous signal control process according to the first embodiment. The memory access controller 202 receives a synchronous signal from any one of the synchronous signal lines 260#0 to 260#3 (step S1001). After receiving the synchronous signal, the memory access controller 202 sets the CPU ID of a synchronous signal sender as the variable x (step S1002). For example, the memory access controller 202 sets 0 as the variable x when receiving a synchronous signal from the synchronous signal line 260#0, and sets 3 as the variable x when receiving a synchronous signal from the synchronous signal line 260#3.

After setting a value as the variable x, the memory access controller 202 determines whether the value for the Valid [x] is TRUE (step S1003). If the value for the Valid [x] is TRUE (step S1003: YES), the memory access controller 202 enters FALSE in the Valid [x] (step S1004). A path following (step S1003: YES) represents the synchronous signal control process consequent to exclusive access, as depicted in FIGS. 4 and 5. Subsequently, the memory access controller 202 sets 0 as the variable y (step S1005), and determines whether the value for an address [y] is equal to the value for the address [x] and the value for a Valid [y] is TRUE (step S1006).

If the value for the address [y] is equal to the value for the address [x] and the value for the Valid [y] is TRUE (step S1006: YES), the memory access controller 202 sends a synchronous signal to the CPU#y (step S1007). When the synchronous signal is sent to the CPU#y, the synchronous signal is sent through the synchronous signal line corresponding to the CPU#y. For example, if y is 0, the synchronous signal is sent through the synchronous signal line 207#0. If y is 3, the synchronous signal is sent through the synchronous signal line 207#3. When the memory access controller 202 executes a process of a route following (step S1006: YES), the CPU#y belongs to the first group of cores having issued an exclusive access request and is a CPU standing by for exclusive access.

After sending the synchronous signal, the memory access controller 202 sets the Valid [y] to FALSE (step S1008). After setting the Valid [y] to FALSE, the memory access controller 202 increases the variable y by 1 (step S1009), and determines if the variable y is greater than or equal to the number of CPUs (step S1010). If the variable y is less than the number of CPUs (step S1010: NO), the memory access controller 202 proceeds to the process of step S1006.

If the value for the address [y] is not equal to the value for the address [x] or the value for the Valid [y] is FALSE (step S1006: NO), the memory access controller 202 proceeds to the process of step S1009. When the memory access controller 202 executes a process of a route following (step S1006: NO), the CPU#y other than the CPU#x belongs to the second group of cores not having made an exclusive access request.

If the value for the Valid [x] is FALSE (step S1003: NO), the memory access controller 202 sets 0 as the variable [y] (step S1011), and determines whether the value for the Valid [y] is FALSE (step S1012). A route following (step S1003: NO) represents the synchronous signal control process consequent to exclusive access, as depicted in FIG. 6. If the value for the Valid [y] is FALSE (step S1012: YES), the memory access controller 202 sends a synchronous signal to the CPU#y (step S1013).

After sending the synchronous signal or if the value for the Valid [y] is TRUE (step S1012: NO), the memory access controller 202 increases the variable y by 1 (step S1014), and determines if the variable y is greater than or equal to the number of CPUs (step S1015). If the variable y is less than the number of CPUs (step S1015: NO), the memory access controller 202 proceeds to the process of step S1012.

If the variable y is greater than or equal to the number of CPUs (step S1010: YES, step S1015: YES), the memory access controller 202 ends the synchronous signal control process.

As described above, according to the memory access controller, the memory access control method, and the memory access control program, multiple cores are classified into the first group of cores having made an exclusive access request and the second group of cores not having made an exclusive access request. When detecting a core having completed exclusive access, the memory access controller releases the core that has made an exclusive access request and is in the standby state from the standby state. In this manner, with respect to a core that is in the standby state and makes no exclusive access request, the memory access controller does not release the core from the standby state and consequently, unnecessarily start the core. As a result, unnecessary access of the memory can be suppressed to reduce power consumption.

The memory access controller may classify multiple cores into the first group of cores having made an exclusive access request to a specific area and the second group of cores not having made an exclusive access request to the specific area. As a result, with respect to a core that has made an exclusive access request to an area other than the specific area and that is in the standby state, the memory access controller does not unnecessarily start the core by releasing the core from the state of standby. Power consumption, therefore, can be reduced.

The memory access controller may send a notification of release from the standby state to cores excluding a core having completed exclusive access from the first group of cores. The core having completed exclusive access is not a core to be released from the standby state, consequently, sending a synchronous signal to the core poses no problem. Nevertheless, information of input of the synchronous signal is saved to the core. Thus, when the core having completed exclusive access newly executes a spinlock process and issues a synchronization wait command, the core is temporarily released from the state of waiting for synchronization. The memory access controller of the first embodiment sends a notification of release from the standby state to cores other than a core having completed exclusive access, thereby preventing the core having completed exclusive access from being released from the state of waiting for synchronization. Hence, power consumption can be reduced.

The detecting unit 303 may detect a core having sent a notification of release from the standby state, as a core having completed exclusive access, among the first group of cores. As a result, the memory access controller can release a core that has made an exclusive access request and is in the standby state from the standby state, through an operation connected with the sending of a synchronous signal from a CPU.

The memory access controller may detect a core having sent a notification of release from the standby state, among the second group of cores and send a notification of release from the standby state to cores excluding the core having sent the notification of release from the standby state, among the second group of cores. As a result, the memory access controller can release a core standing by for a purpose other than exclusive access, from the standby state and does not unnecessarily start a core that has made an exclusive access request and is in a state of standby by releasing the core from the standby state. Hence, power consumption can be reduced.

Figure 11:
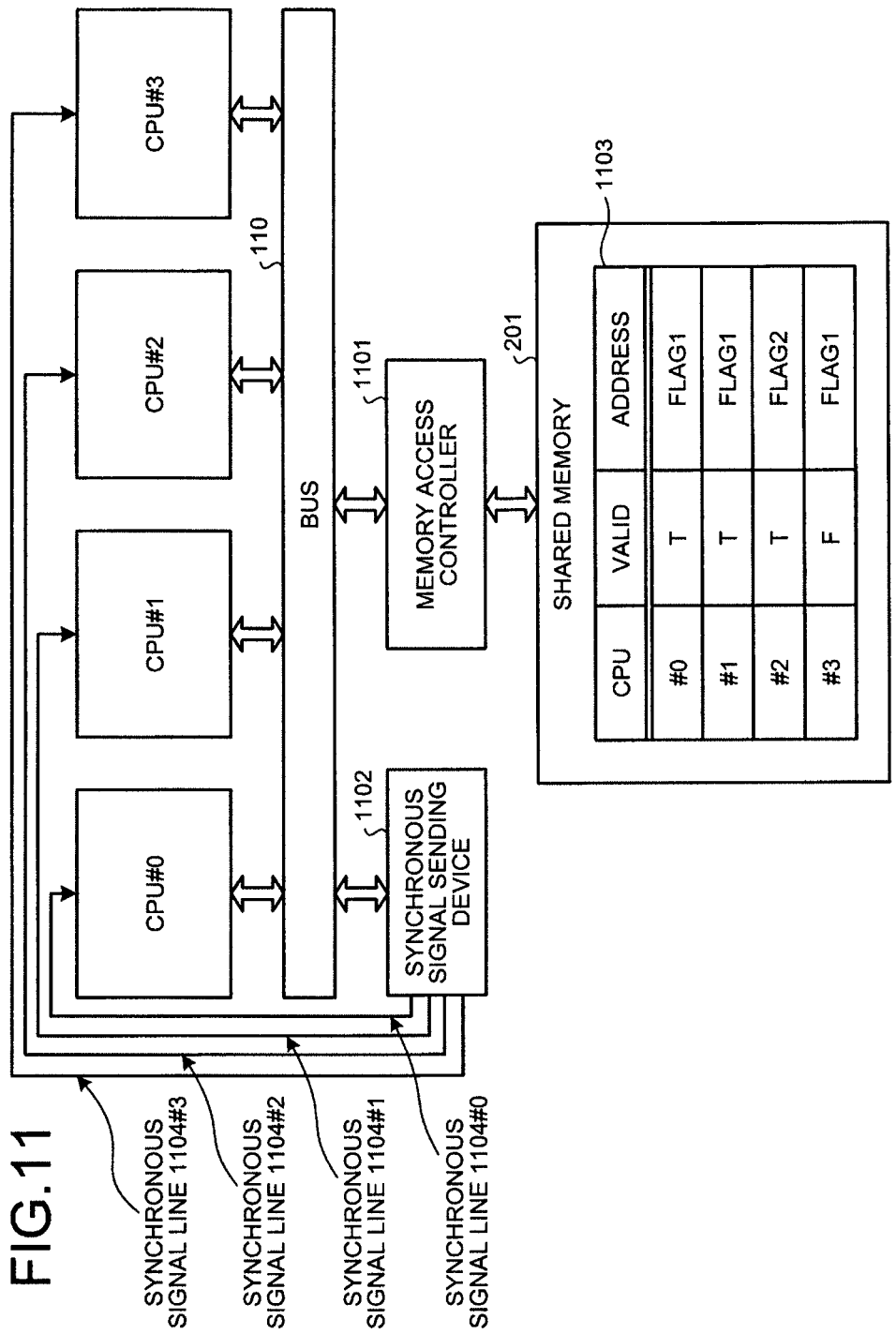
FIG. 11 is an explanatory diagram of the relation between CPUs and a memory access controller in a multi-core processor system 100 according to a second embodiment.

FIG. 11 is an explanatory diagram of the relation between CPUs and a memory access controller in the multi-core processor system 100 according to a second embodiment. In the first embodiment, the memory access controller 202 executes the synchronous signal control process. In the second embodiment, however, the CPU#0 to CPU#3 execute the synchronous signal control process. Hardware depicted in FIG. 11 includes the shared memory 201, a memory access controller 1101, a synchronous signal sending device 1102, and the CPU#0 to CPU#3 making up the CPUs 101. The memory access controller 1101 and the CPU#0 to CPU#3 are connected through the bus 101.

The CPU#0 to CPU#3 are connected to the synchronous signal sending device 1102 not only through the bus 110 but also through synchronous signal lines 1104. For example, the synchronous signal sending device 1102 send a synchronous signal to the CPU#0 through a synchronous signal line 1104#0. In the same manner, the synchronous signal sending device 1102 sends a synchronous signal to the CPU#1 to CPU#3 through synchronous signal lines 1104#1 to 1104#3, respectively.

The memory access controller 1101 has a conventional exclusive access mechanism, and serves as an apparatus that provides the CPU#0 to CPU#3 with a function of exclusively accessing the shared memory 201. The exclusive access function has an exclusive load command and an exclusive store command.

The synchronous signal sending device 1102 has a function of sending a synchronous signal in response to a synchronous signal sending request from any one of the CPU#0 to CPU#3. For example, when receiving from the CPU#0, a synchronous signal sending request to send a synchronous signal to the CPU#3, the synchronous signal sending device 1102 sends a synchronous signal to the CPU#3 through the synchronous signal line 1104#3.

A load destination address flag table 1103 is stored in the shared memory 201. The table has three fields, including a CPU field, a Valid field, and an address field. In the CPU field, CPU IDs corresponding to records of the load destination address flag table 1103 are entered. The Valid field and the address field of the load destination address flag table 1103 are the same as the Valid field and the address field of the load destination address management flag registers 204, and description thereof is omitted.

For example, in the load destination address flag table 1103, the CPU#0 and the CPU#1 are indicated to have made an exclusive load request for the shared area corresponding to the flag 1, the CPU#2 is indicated to have made an exclusive load request for the shared area corresponding to the flag 2, and the CPU#3 is indicated to have completed exclusive storing of the shared area corresponding to the flag 1.

FIG. 12 is a block diagram of functional units of the multi-core processor system 100 according to the second embodiment. The multi-core processor system 100 includes an exclusive access unit 1201 and a synchronous signal control unit 1203. Functions of the synchronous signal control unit 1203 are realized when the CPU#0 to the CPU#3 execute programs stored in memory devices such as the ROM 102, the RAM 103, the flash ROM 104, the flash ROM 106, etc., depicted in FIG. 1.

The synchronous signal control unit 1203 has a setting unit 1204, a determining unit 1205, a detecting unit 1206, and a notification requesting unit 1207. In FIG. 12, the synchronous signal control unit 1203 is included in the CPU#0 as a function of the CPU#0. The synchronous signal control unit 1203, however, may be included in each CPU, i.e., in the CPU#0 to the CPU#3, respectively, as a function thereof.

The exclusive access unit 1201 has a function of executing an exclusive load process and an exclusive store process based on load destination address management registers 1202 when an exclusive load command and an exclusive store command are issued from any one of the CPU#0 to CPU#3.

The load destination address management registers 1202 represents a group of registers accessed by the exclusive access unit 1201. The load destination address management registers 1202 have a tag field and an address field for each CPU. The tag field and the address field are the same as the tag field and address field of the load destination address management flag registers 204, and description thereof is omitted.

The synchronous signal control unit 1203 executes a synchronous signal control process of controlling a synchronous signal sending destination based on a request for release from the standby state made by software running on each CPU and based on the load destination address flag table 1103. Following execution of the synchronous signal control process, a synchronous signal is sent by the synchronous signal sending device 1102 through the synchronous signal lines 1104#0 to 1104#3.

The setting unit 1204 has a function of updating a value in the load destination address flag table 1103. For example, when the exclusive load process is executed by software running on the CPU#0, the setting unit 1204 changes the value of the Valid field on the record corresponding to the CPU#0 of the load destination address flag table 1103, from FALSE to TRUE.

The determining unit 1205 has a function of determining to which group, the first group of cores having made an exclusive access request to the shared memory 201 or the second group of cores not having made an exclusive access request to the shared memory 201, each core belongs. The determining unit 1205 may determine to which group, the first group of cores having made an exclusive access request or the second group of cores not having made an exclusive access request, each core belongs based on a determination of whether the core has made an exclusive access request to a specific area of the shared memory 201.

For example, if the value for the Valid field of the load destination address flag table 1103 is TRUE, the determining unit 1205 being executed on the CPU#0 determines that the CPU#0 belongs to the first group of cores having made an exclusive access request. If the value is FALSE, the determining unit 1205 determines that the CPU#0 belongs to the second group of cores not having made an exclusive access request. The result of the determination is stored to the register, cache memory, RAM 103, etc., of the CPU executing the determining unit.

The detecting unit 1206 has a function of detecting a completion of exclusive access by a core consequent to determining that the core belongs to the first group of cores. The detecting unit 1206 may detect the completion of exclusive access upon determining that the core belongs to the first group of cores and the core has made a request for release from the standby state through software running on the core.

For example, the detecting unit 1206 being executed on the CPU#0 detects completion of exclusive access by the CPU#0, upon detecting the issue of a request for release from the standby state by software running on the CPU#0 and upon the determining unit 1205 determining the CPU#0 to be a core belonging to the first group. The result of the detection is stored to a register, cache memory, the RAM 103, etc., of the CPU executing the detecting unit.

The detecting unit 1206 may detect that a core has made a request for release from the standby state through software running on the core upon the determining unit 1205 determining that the core belongs to the second group. For example, the detecting unit 1206 detects the CPU#0 as a CPU having sent a notification of release from the standby state when the detecting unit 1206 detects the CPU#0 issuing a request for release from the standby state through software running on the CPU#0 and the determining unit 1205 determines the CPU#0 to be a core belonging to the second group.

The notification requesting unit 1207 has a function of requesting that a notification of release from the standby state be sent to a core standing by for exclusive access, among the first group of cores when the detecting unit 1206 detects a core having completed exclusive access. When the detecting unit 1206 detects a core having completed exclusive access, the notification requesting unit 1207 may request that a notification of release from the standby state be sent to cores excluding the core having completed exclusive access, among the first group of cores.

For example, when the CPU#0 is detected as a CPU having completed exclusive access, the notification requesting unit 1207 requests the synchronous signal sending device 1102 to send a synchronous signal to a group of CPUs for which the value of the Valid field is TRUE.

When the detecting unit 1206 detects a core having made a request for release from the standby state, among the second group of cores, the notification requesting unit 1207 may request that a notification of release from the standby state be sent to cores excluding the core having made a request for release from the standby state among the second group of cores.

For example, a case is assumed where the detecting unit 1206 detects the CPU#1 as a CPU having sent a notification of release from the standby state and detects, as the second group of cores, the CPU#1 and the CPU#3 for which the Valid fields are set to FALSE. In this situation, the notification requesting unit 1207 requests the synchronous signal sending device 1102 to send a synchronous signal to the CPU#3 excluding the CPU#1 among the second group of cores. The result of the request may be stored to a register, cache memory, RAM, etc.

FIGS. 13A and 13B are flowcharts of the synchronous signal control process consequent to exclusive access according to the second embodiment. The synchronous signal control process is executed at each of the CPU#0 to CPU#3. FIGS. 13A, 13B, and 14 depict explanations of an assumed case where an arbitrary CPU#x among the CPU#0 to CPU#3 executes the synchronous signal control process. Terms "Valid [x]" and "address [x]" represent the Valid field and the address field in a record with the CPU field set to CPU#x in the load destination address flag table 1103.

The CPU#x makes an exclusive load request with respect to #adr (step S1301). For example, when software running on the CPU#x makes an exclusive access request, the synchronous signal control process embedded as a library is executed.

After making an exclusive load request, the CPU#x sets #adr and Valid in the record for the CPU#x, in the load destination address flag table 1103 (step S1302). For example, when the variable x is 2, the CPU#x selects a record with the CPU field set to CPU#2 and sets TRUE and #adr in the Valid field and the address field of the record, respectively. After setting these values, the CPU#x makes an exclusive load request to the memory access controller 1101 (step S1303).

After making the exclusive load request, the CPU#x determines whether the CPU#x has succeeded in exclusive loading (step S1304). When failing in exclusive loading (step S1304: NO), the CPU#x issues a synchronous signal wait command (step S1307). Issuing the synchronous signal wait command, the CPU#x stands by until receiving a synchronous signal. When receiving a synchronous signal, the CPU#x proceeds to the process at step S1301. When succeeding in exclusive loading (step S1304: YES), the CPU#x makes an exclusive store request to the memory access controller 1101 (step S1305).

After making an exclusive store request, the CPU#x determines whether the CPU#x has succeeded in exclusive storing (step S1306). When failing in exclusive storing (step S1306: NO), the CPU#x proceeds to the process at step S1307. When succeeding in exclusive storing (step S1306: YES), the CPU#x accesses #adr (step S1308).

After accessing #adr, CPU#x sets FALSE in the Valid [x] (step S1309). After setting FALSE, the CPU#x sets the variable y to 0 (step S1310), and acquires a value for the Valid [y] and a value for the address [y] from the record for the CPU#y of the load destination address flag table 1103 (step S1311).

After acquiring these values, the CPU#x determines whether the value for the address [y] is equal to a value for the address [x] and the value for the Valid [y] is TRUE (step S1312). If the value for the address [y] is equal to the value for the address [x] and the value for the Valid [y] is TRUE (step S1312: YES), the CPU#x selects the CPU#y as a synchronous signal sending destination (step S1313). When the CPU#x executes a process of a route following (step S1312: YES), the CPU#y belongs to the first group of cores having made an exclusive access request and is a CPU standing by for exclusive access.

After selecting the synchronous signal sending destination, the CPU#x increases the variable y by 1 (step S1314), and determines if the variable y is greater than or equal to the number of CPUs (step S1315). If the variable y is smaller than the number of CPUs (step S1315: NO), the CPU#x proceeds to the process of step S1311. If the value for the address [y] is not equal to the value for the address [x] or the value for the Valid [y] is FALSE (step S1312: NO), the CPU#x proceeds to the process of step S1314. When the CPU#x executes a process of a route following (step S1312: NO), the CPU#y other than the CPU#x belongs to the second group of cores not having made an exclusive access request.

If the variable y is greater than or equal to the number of CPUs (step S1315: YES), the CPU#x sets the Valid field for the selected CPU in the load destination address flag table 1103, to FALSE (step S1316). After setting FALSE, the CPU#x writes synchronous signal sending destination information to the synchronous signal sending device 1102 (step S1317), and ends the synchronous signal control process.

FIG. 14 is a flowchart of a synchronous signal control process consequent to an event other than exclusive access according to the second embodiment. The CPU#x detects a request for release from the standby state (step S1401). For example, when software running on the CPU#x makes a request for release from the standby state, the synchronous signal control process embedded as a library is executed. After detecting the request for release from the standby state, the CPU#x sets the ID of the CPU having detected the request as the variable x (step S1402). The CPU having detected the request matches the CPU executing the synchronous signal control process. After setting the ID, the CPU#x determines whether the value for the Valid [x] is FALSE (step S1403).

If the value for the Valid [x] is FALSE (step S1403: YES), the CPU#x sets the variable y to 0 (step S1404), and determines whether the value for the Valid [y] is FALSE (step S1405). If the value for the Valid [y] is FALSE (step S1405: YES), the CPU#x selects the CPU#y as a synchronous signal sending destination (step S1406).

Following the end of the process of step S1406 or if the value for the Valid [y] is FALSE (step S1405: NO), the CPU#x increases the variable y by 1 (step S1407), and determines if the variable y is greater than or equal to the number of CPUs (step S1408). If the variable y is smaller than the number of CPUs (step S1408: NO), the CPU#x proceeds to the process of step S1405. If the variable y is greater than or equal to the number of CPUs (step S1408: YES), the CPU#x writes synchronous signal sending destination information to the synchronous signal sending device 1102 (step S1409), and ends the synchronous signal control process that is consequent to an event other than exclusive access.

If the value for the Valid [x] is TRUE (step S1403: NO), the CPU#x ends the synchronous signal control process that is consequent to an event other than exclusive access. If NO results at step S1403, it means the synchronous signal control process is consequent to exclusive access. Subsequent to NO at step S1403, therefore, the CPU#x may proceed to step S1309 to continue executing the process from step S1309.

As described above, according to the multi-core processor system, the memory access control method, and the memory access control program, the multi-core processor system determines to which group, the first group of cores having made an exclusive access request or the second group of cores not having made an exclusive access request, each of multiple cores belongs. Subsequently, when finding that a core determined to be a core belonging to the first group has completed exclusive access, the multi-core processor system sends to a core standing by for exclusive access, a notification of release from the standby state. In this manner, the multi-core processor system does not unnecessarily start a core that is in the standby state and made no exclusive access request, by releasing the core from the standby state. As a result, unnecessary access of the memory can be suppressed to reduce power consumption.

The multi-core processor system may determine to which group, the first group of cores having made an exclusive access request to a specific area of the shared memory or the second group of cores not having made an exclusive access request to a specific area of the shared memory, each core belongs. In this manner, the multi-core processor system does not unnecessarily start a core that has made an access request to an area other than the specific area and is in the standby state, by releasing the core from the standby state. Hence, power consumption can be reduced.

The multi-core processor system may send to cores excluding a core having completed exclusive access from the first group of cores, a notification of release from the standby state, thereby enabling the multi-core processor system to prevent the core that has completed exclusive access from being released from the state of waiting for synchronization. Hence, power consumption can be reduced.

When a core determined to be a core belonging to the first group makes a request for release from a state of standby through software running on the core, the multi-core processor system may detect the core determined to be a core belonging to the first group completing exclusive access. As a result, the multi-core processor system can release a core that has made an exclusive access request and is in the standby state, from the standby state through an operation connected with a request for release from the standby state.

When finding that a core determined to be a core belonging to the second group has made a request for release from a state of standby through software running on the core, the multi-core processor system may send a notification of release from the standby state to cores excluding the core having made the request for release from a state of standby from the second group of cores. In this manner, the multi-core processor system can release from the standby state, a core standing by for a purpose other than exclusive access, and does not unnecessarily start a core that has made an exclusive access request and is in a state of standby, by releasing the core from the standby state. Hence, power consumption can be reduced.

The memory access control methods described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The memory access controller, the multi-core processor system, the memory access control method, and the memory access control program offer an effect of releasing a core that has requested exclusive access request and is in a standby state from the standby state without starting another unintended core and thus, reduce power consumption.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising:
   a shared memory;
   a plurality of cores comprising, a first group of the plurality of cores configured to make a request concerning exclusive access to the shared memory and a second group of the plurality of cores configured to make a request for a purpose other than exclusive access; and
   a memory access controller configured to control an access from the plurality of cores to the shared memory on the basis of an access request from the plurality of cores and to detect a request for release from a standby state, the request being sent by a first core of the plurality of cores,
   wherein the memory access controller, upon detecting the request for release from the standby state, the request being sent by the first core of the first group, sends to the cores among the first group of cores excluding the first core, the notification of release from the standby state.

2. The multi-core processor system according to claim 1, wherein
   the memory access controller is configured to determine to which of the first and second groups each of the cores belongs.

3. The multi-core processor system according to claim 1, wherein:
   the memory access controller is operable, when the memory access controller determines a third core to belong to the second group, to detect that the third core has made the request for release from the standby state through software running on the third core; and
   the memory access controller is operable, when the memory access controller detects that the third core has made the request for release from the standby state, to send to the cores among the second group of cores excluding the third core having made the request for release from the standby state, the notification of release from the standby state.

4. A method of controlling a multi-core processor system, the system comprising a shared memory and a plurality of cores comprising a first group of the plurality of cores configured to make a request concerning exclusive access to the shared memory and a second group of the plurality of cores configured to make a request for a purpose other than exclusive access, the method comprising:
   detecting a request for release from a standby state, the request being sent by a first core of the first group; and
   sending a notification of release from the standby state to the first group of cores excluding the first core.

5. A control program which, when executed on a multi-core processor system, the system comprising a shared memory and a plurality of cores comprising a first group of the plurality of cores configured to make a request concerning exclusive access to the shared memory and a second group of the plurality of cores configured to make a request for a purpose other than exclusive access, causes the system to carry out a method comprising:
   detecting a request for release from a standby state, the request being sent by a first core of the first group; and
   sending a notification of release from the standby state to the first group of cores excluding the first core.

* * * * *